(12) United States Patent
Chester et al.

(10) Patent No.: US 7,974,413 B2
(45) Date of Patent: Jul. 5, 2011

(54) SPREAD SPECTRUM COMMUNICATIONS SYSTEM AND METHOD UTILIZING CHAOTIC SEQUENCE

(75) Inventors: David B. Chester, Palm Bay, FL (US); Alan J. Michaels, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 825 days.

(21) Appl. No.: 11/759,273

(22) Filed: Jun. 7, 2007

(65) Prior Publication Data

US 2008/0304666 A1    Dec. 11, 2008

(51) Int. Cl.
*H04L 9/00*    (2006.01)

(52) U.S. Cl. .................................................. 380/263

(58) Field of Classification Search .................. 380/263
See application file for complete search history.

(56) References Cited

U.S. PATENT DOCUMENTS

| | | |
|---|---|---|
| 3,564,223 A | 2/1971 | Harris et al. |
| 4,646,326 A | 2/1987 | Backof, Jr. et al. |
| 4,703,507 A | 10/1987 | Holden |
| 5,007,087 A | 4/1991 | Bernstein et al. |
| 5,048,086 A | 9/1991 | Bianco et al. |
| 5,077,793 A | 12/1991 | Falk et al. |
| 5,276,633 A | 1/1994 | Fox et al. |
| 5,297,153 A | 3/1994 | Baggen et al. |
| 5,297,206 A | 3/1994 | Orton |
| 5,319,735 A | 6/1994 | Preuss et al. |
| 5,412,687 A | 5/1995 | Sutton et al. |
| 5,598,476 A | 1/1997 | LaBarre et al. |
| 5,757,923 A | 5/1998 | Koopman, Jr. |
| 5,811,998 A | 9/1998 | Lundberg et al. |
| 5,852,630 A | 12/1998 | Langberg et al. |
| 5,900,835 A | 5/1999 | Stein |
| 5,924,980 A | 7/1999 | Coetzee |
| 5,937,000 A | 8/1999 | Lee et al. |

(Continued)

FOREIGN PATENT DOCUMENTS

EP    0 849 664 A2    6/1998

(Continued)

OTHER PUBLICATIONS

Communication Systems Based on Chaos, by Francisco Javier Escribano Aparicio, May 2007.*

(Continued)

*Primary Examiner* — Farid Homayounmehr
(74) *Attorney, Agent, or Firm* — Fox Rothschild, LLP; Robert J. Sacco

(57) ABSTRACT

A method is provided for generating a coherent chaotic sequence spread spectrum communications system. The method includes phase modulating a carrier with information symbols. The method also includes generating a string of discrete time chaotic samples. The method further includes modulating the carrier in a chaotic manner using the string of discrete time chaotic samples. Each of the discrete time chaotic samples has a shorter sample time interval than the duration of the information symbols. The generating step includes selecting a plurality of polynomial equations. The generating step also includes using residue number system (RNS) arithmetic operations to respectively determine solutions for the polynomial equations. The solutions are iteratively computed and expressed as RNS residue values. The generating step further includes determining a series of digits in the weighted number system based on the RNS residue values. The method further includes synchronizing the chaos generated at the receiver with that generated at the transmitter without periodic transfer of state update information.

30 Claims, 7 Drawing Sheets

U.S. PATENT DOCUMENTS

| | | | |
|---|---|---|---|
| 6,014,446 A | 1/2000 | Finkelstein | |
| 6,023,612 A | 2/2000 | Harris et al. | |
| 6,038,317 A | 3/2000 | Magliveras et al. | |
| 6,078,611 A | 6/2000 | La Rosa et al. | |
| 6,304,216 B1 | 10/2001 | Gronemeyer | |
| 6,331,974 B1 | 12/2001 | Yang et al. | |
| 6,377,782 B1 | 4/2002 | Bishop et al. | |
| 6,570,909 B1 | 5/2003 | Kansakoski et al. | |
| 6,614,914 B1 | 9/2003 | Rhoads et al. | |
| 6,744,893 B1 | 6/2004 | Fleming-Dahl | |
| 6,754,251 B1 | 6/2004 | Sriram et al. | |
| 6,766,345 B2 | 7/2004 | Stein et al. | |
| 6,842,479 B2 | 1/2005 | Bottomley | |
| 6,980,656 B1 | 12/2005 | Hinton, Sr. et al. | |
| 6,986,054 B2 | 1/2006 | Kaminaga et al. | |
| 7,023,323 B1 | 4/2006 | Nysen | |
| 7,027,598 B1 | 4/2006 | Stojancic et al. | |
| 7,069,492 B2 | 6/2006 | Piret et al. | |
| 7,076,065 B2 | 7/2006 | Sherman et al. | |
| 7,078,981 B2 | 7/2006 | Farag | |
| 7,079,651 B2 | 7/2006 | Den Boer et al. | |
| 7,095,778 B2 | 8/2006 | Okubo et al. | |
| 7,133,522 B2 | 11/2006 | Lambert | |
| 7,170,997 B2 | 1/2007 | Petersen et al. | |
| 7,190,681 B1 | 3/2007 | Wu | |
| 7,200,225 B1 | 4/2007 | Schroeppel | |
| 7,233,672 B2 * | 6/2007 | Mitchell et al. | 380/278 |
| 7,233,969 B2 | 6/2007 | Rawlins et al. | |
| 7,233,970 B2 | 6/2007 | North et al. | |
| 7,245,723 B2 | 7/2007 | Hinton, Sr. et al. | |
| 7,269,198 B1 | 9/2007 | Elliott et al. | |
| 7,269,258 B2 | 9/2007 | Ishihara et al. | |
| 7,272,168 B2 | 9/2007 | Akopian | |
| 7,277,540 B1 | 10/2007 | Shiba et al. | |
| 7,415,114 B2 * | 8/2008 | Lo et al. | 380/283 |
| 7,447,386 B2 * | 11/2008 | Mitchell et al. | 385/1 |
| 7,529,292 B2 | 5/2009 | Bultan et al. | |
| 7,643,537 B1 | 1/2010 | Giallorenzi et al. | |
| 7,779,060 B2 | 8/2010 | Kocarev et al. | |
| 7,797,060 B2 | 9/2010 | Kocarev et al. | |
| 7,830,214 B2 | 11/2010 | Han et al. | |
| 7,853,014 B2 | 12/2010 | Blakley et al. | |
| 2002/0099746 A1 | 7/2002 | Tie et al. | |
| 2003/0044004 A1 | 3/2003 | Blakley et al. | |
| 2004/0001556 A1 | 1/2004 | Harrison et al. | |
| 2004/0059767 A1 | 3/2004 | Liardet | |
| 2004/0196212 A1 | 10/2004 | Shimizu | |
| 2005/0031120 A1 | 2/2005 | Samid | |
| 2005/0050121 A1 | 3/2005 | Klein et al. | |
| 2005/0089169 A1 | 4/2005 | Kim et al. | |
| 2005/0207574 A1 | 9/2005 | Pitz et al. | |
| 2005/0274807 A1 | 12/2005 | Barrus et al. | |
| 2006/0072754 A1 | 4/2006 | Hinton et al. | |
| 2006/0123575 A1 | 6/2006 | Wilson et al. | |
| 2006/0209932 A1 | 9/2006 | Khandekar et al. | |
| 2006/0251250 A1 | 11/2006 | Ruggiero et al. | |
| 2007/0121945 A1 | 5/2007 | Han et al. | |
| 2007/0230701 A1 | 10/2007 | Park et al. | |
| 2008/0008320 A1 | 1/2008 | Hinton et al. | |
| 2008/0016431 A1 | 1/2008 | Lablans | |
| 2008/0095215 A1 | 4/2008 | McDermott et al. | |
| 2008/0198832 A1 | 8/2008 | Chester | |
| 2008/0263119 A1 * | 10/2008 | Chester et al. | 708/446 |
| 2008/0294710 A1 | 11/2008 | Michaels | |
| 2008/0294956 A1 | 11/2008 | Chester et al. | |
| 2008/0304553 A1 | 12/2008 | Zhao et al. | |
| 2008/0304666 A1 | 12/2008 | Chester et al. | |
| 2008/0307022 A1 | 12/2008 | Michaels et al. | |
| 2008/0307024 A1 | 12/2008 | Michaels et al. | |
| 2009/0034727 A1 * | 2/2009 | Chester et al. | 380/263 |
| 2009/0044080 A1 * | 2/2009 | Michaels et al. | 714/780 |
| 2009/0110197 A1 | 4/2009 | Michaels | |
| 2009/0122926 A1 | 5/2009 | Azenkot et al. | |
| 2009/0196420 A1 | 8/2009 | Chester et al. | |
| 2009/0202067 A1 | 8/2009 | Michaels et al. | |
| 2009/0245327 A1 | 10/2009 | Michaels | |
| 2009/0279688 A1 | 11/2009 | Michaels et al. | |
| 2009/0279690 A1 | 11/2009 | Michaels et al. | |
| 2009/0296860 A1 | 12/2009 | Chester et al. | |
| 2009/0300088 A1 | 12/2009 | Michaels et al. | |
| 2009/0309984 A1 | 12/2009 | Bourgain et al. | |
| 2009/0310650 A1 | 12/2009 | Chester et al. | |
| 2009/0323766 A1 | 12/2009 | Wang et al. | |
| 2009/0327387 A1 | 12/2009 | Michaels et al. | |
| 2010/0091700 A1 * | 4/2010 | Michaels | 370/328 |
| 2010/0111296 A1 | 5/2010 | Brown et al. | |

FOREIGN PATENT DOCUMENTS

| | | |
|---|---|---|
| EP | 0 949 563 | 10/1999 |
| EP | 2 000 900 | 12/2008 |
| EP | 2 000 902 A2 | 12/2008 |
| GB | 1167272 A | 10/1969 |
| WO | WO-0135572 A2 | 5/2001 |
| WO | WO-2006 110954 | 10/2006 |
| WO | WO 2008065191 | 6/2008 |
| WO | WO-2008099367 A2 | 8/2008 |
| WO | WO-2008130973 A1 | 10/2008 |
| WO | WO 2009146283 | 12/2009 |

OTHER PUBLICATIONS

U.S. Appl. No. 11/737,459, David Chester et al.
U.S. Appl. No. 11/832,160, David Chester et al.
Deckert, T., et al: "Throughput of WLAN with TDMA and Superimposed Transmission with Resource and Traffic Constraints." Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.
Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.
Manikandan, et al, "A Novel Pulse Based Ultrawide Band System Using Chaotic Spreading Sequences" Communication Systems Software and Middleware, 2007. Comsware 2007. 2nd International Conference on, IEEE, PI, Jan. 1, 2007, pp. 1-5, XP031113946 ISBN: 978-1-4244-0613-5; p. 1, p. 5.
Nakamura, et al, "Chaotic synchronization-based communications using constant envelope pulse" Electrical Engineering in Japan, [Online] vol. 163, No. 3, Feb. 12, 2008 , pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.
Salberg, et al., "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.
Barile, Margherita, "Bijective," From MathWorld—A Wolfram Web Resource, created by Eric W. Weisstein. http://mathworld.wolfram.com/Bijective.html.
Weisstein, Eric W., "Injection," From MathWorld—A Wolfram Web Resource. http://mathworld.wolfram.com/Injection.html.
Weisstein, Eric W. "Surjection," From MathWorld—A Wolfram Web Resource, http://mathworld.wolfram.com/Surjection.html.
Yen, et al., (1999) "Residual Number System Assisted CDMA: A New System Concept", In: ACTS'99, Jun. 8-11, 1999, Sorrento, Italy.
Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.
Abel, et al., "Chaos Communications—Principles, Schemes, and System Analysis" Proceedings for the IEEE, IEEE. New York, NY. vol. 90, No. 5, May 1, 2002, XP011064997, ISSN: 0018-9219.
Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.
Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/ pdf/PRE/v69/i2/e026201 [retrieved Oct. 13, 2008].
Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.
De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.
Knuth, D.E., "The Art of Computer Programming, Third Edition; vol. 2 Seminumerical Algorithms". Feb. 2005, Addison-Wesley, Boston 310200, XP002511903, pp. 142-146, 284-292.
Pleszczynski, S, "On the Generation of Permutations" Information Processing Letters, Amsterdam, NL, vol. 3, No. 6, Jul. 1, 1975, pp. 180-183, XP008023810, ISSN: 0020-0190.
Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.
Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.
Vanwiggeren, et al., "Chaotic Communication Using Time-Delayed Ooptical Systems", International Jnl of Bifurcation and Chaos, vol. 9, No. 11, (1999) pp. 2129-2156, World Scientific Pulishing Company.
Morsche, et al., "Signals and Systems," lecture notes, University of Eindhoven, The Netherlands, 1999.
Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.
Kolumban, et al., "Chaotic Communications with Correlator Receivers: Theory and Performance Limits" Proceedings of the IEEE, vol. 90, No. 5, May 2002.
Michaels, et al., U.S. Appl. No. 12/056,024, filed Mar. 26, 2008, entitled "Selective Noise Cancellation of a Spread Spectrum Signal".
Michaels, et al., U.S. Appl. No. 12/117,086, filed May 8, 2008, Entitled "Cryptographic System Including a Mixed Radix Number Generator With Chosen Statistical Artifacts".
Chester, et al., U.S. Appl. No. 12/116,104, filed May 6, 2008, Entitled, "A Closed Galois Field Cryptographic System".
Chester, et al., U.S. Appl. No. 12/131,386, filed Jun. 2, 2008, Entitled "Adaptive Correlation".
Chester, et al., U.S. Appl. No. 12/137,593, filed Jun. 12, 2008, entitled "Featureless Coherent Chaotic Amplitude Modulation".
Michaels, et al., U.S. Appl. No. 12/129,197, filed May 29, 2008, entitled "Digital Generation of an Accelerated or Decelerated Chaotic Numerical Sequence".
Michaels, et al., U.S. Appl. No. 12/129,654, filed May 29, 2008, entitled "Sine/Cosine Generator".
Michaels, et al., U.S. Appl. No. 12/496,214, filed Jul. 1, 2009, entitled "Anti-Jam Communications Having Selectively Variable PAPR Including Cazac Waveform".
Michaels, et al., U.S. Appl. No. 12/507,111, filed Jul. 22, 2009, entitled "Anti-Jam Communications Using Adaptive Chaotic Spread Waveform".
Chester, at al., U.S. Appl. No. 12/480,264, filed Jun. 8, 2009, entitled "Continuous Time Chaos Dithering".
Chester, at al., U.S. Appl. No. 12/481,704, filed Jun. 10, 2009, entitled "Discrete Time Chaos Dithering".
Michaels, at al., U.S. Appl. No. 12/345,163, filed Dec. 29, 2008, entitled "Communications System Employing Chaotic Spreading Codes With Static Offsets".
Micheals, at al., U.S. Appl. No. 12/344,962, filed Dec. 29, 2008, entitled "Communications System Employing Orthogonal Chaotic Spreading Codes".
Michaels, et al., U.S. Appl. No. 12/396,828, filed Jun. 3, 2009, entitled "Communications System Employing Orthogonal Chaotic Spreading Codes".
Michaels, et al., U.S. Appl. No. 12/496,170, filed Jul. 1, 2009, entitled "Permission Based Multiple Access Communications Systems".
Michaels, et al., U.S. Appl. No. 12/496,233, filed Jul. 1, 2009, entitled "Permission-Based Secure Multiple Access Communication Systems Rotations".
Michaels, et al., U.S. Appl. No. 12/507,512, filed Jul. 22, 2009, entitled "Permission-Based TDMA Chaotic Communication Systems".
Micheals, et al., U.S. Appl. No. 12/496,085, filed Jul. 1, 2009, entitled, "High-Speed Cryptographic System Using Chaotic Sequences".
Michaels, et al., U.S. Appl. No. 12/496,123, filed Jul. 1, 2009, entitled, "Rake Receiver for Spread Spectrum Chaotic Communications Systems".
Michaels, et al., U.S. Appl. No. 12/496,146, filed Jul. 1, 2009, entitled "Improved Symbol Estimation for Chaotic Spread Spectrum Signal".
Micheals, et al., U.S. Appl. No. 12/480,316, filed Jun. 8, 2009, entitled "Symbol Duration Dithering for Secured Chaotic Communications".
Michaels, et al., U.S. Appl. No. 12/496,183, filed Jul. 1, 2009, entitled "Bit Error Rate Reduction in Chaotic Communications".
Michaels, Alan, U.S. Appl. No. 12/248,131, filed Oct. 9, 2008, entitled "Ad-Hoc Network Acquisition Using Chaotic Sequence Spread Waveform".
Michaels, Alan, U.S. Appl. No. 12/201,021, filed Aug. 29, 2008, entitled, "Multi-Tier Ad-Hoc Network Communications".
Chester, D., U.S. Appl. No. 12/026,217 entitled "Cryptographic System Incorporating a Digitally Generated Chaotic Numerical Sequence" filed Feb. 5, 2008.
Bererber, S.M., et al., "Design of a CDMA Sysetm in FPGA Technology", Vehicular Technology Conference, 2007. VTC2007-Spring. IEEE 65th Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].
Soobul, Y., et al. "Digital chaotic coding and modulation in CDMA" IEEE Africon 2002 Oct. 2, 2002,Oct. 4, 2002, pp. 841-846, XP002575052 Retrieved from the Internet: URL:http://ieeexplore. ieee.org> [retrieved on Mar. 23, 2010].
El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA,IEEE, Mar. 16, 2004, pp. _1-1_1, XP010715117 ISBN: 978-977-5031-77-8.
Rabiner, Lawrence R., "A Tutorial on Hidden Markov Models and Selected Applications in Speech Recognition", Proceedings of the IEEE, vol. 77, No. 2, Feb. 1989.
Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.
Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.
Boyar, "Inferring Sequences Produce by Pseudo-Random No. Generators", Journal of the Associate for Computing Machine, vol. 36, No. 1, pp. 20-41, 1989.
Barile, M., "Bijective", From MathWorld—A Wolfram Web Resource, created by Eric W. Weisstein, [online] [retrieved on Nov. 8, 2010] Retrieved from the Internet: <http://mathworld.wolfram.com/ Bijective.html>.
Weisstein, E., Surejection:, From MathWorld—A Wolfram Web Resource [online] [retrieved on Nov. 8, 2010] Retrieved from the Internet: <http://mathworld.wolfram.com/surjection.html>.
Weisstein, E., Surejection:, From MathWorld—A Wolfram Web Resource [online] [retrieved on Nov. 8, 2010] Retrieved from the Internet: http://mathworld.wolfram.com/injection.html>.
Taylor, F.J., "Residue Arithmetic A Tutorial with Examples", Computer, vol. 17, No. 5, pp. 50-62, May 1984, doi: 10.1109/MC. 1984. 1659138.

* cited by examiner

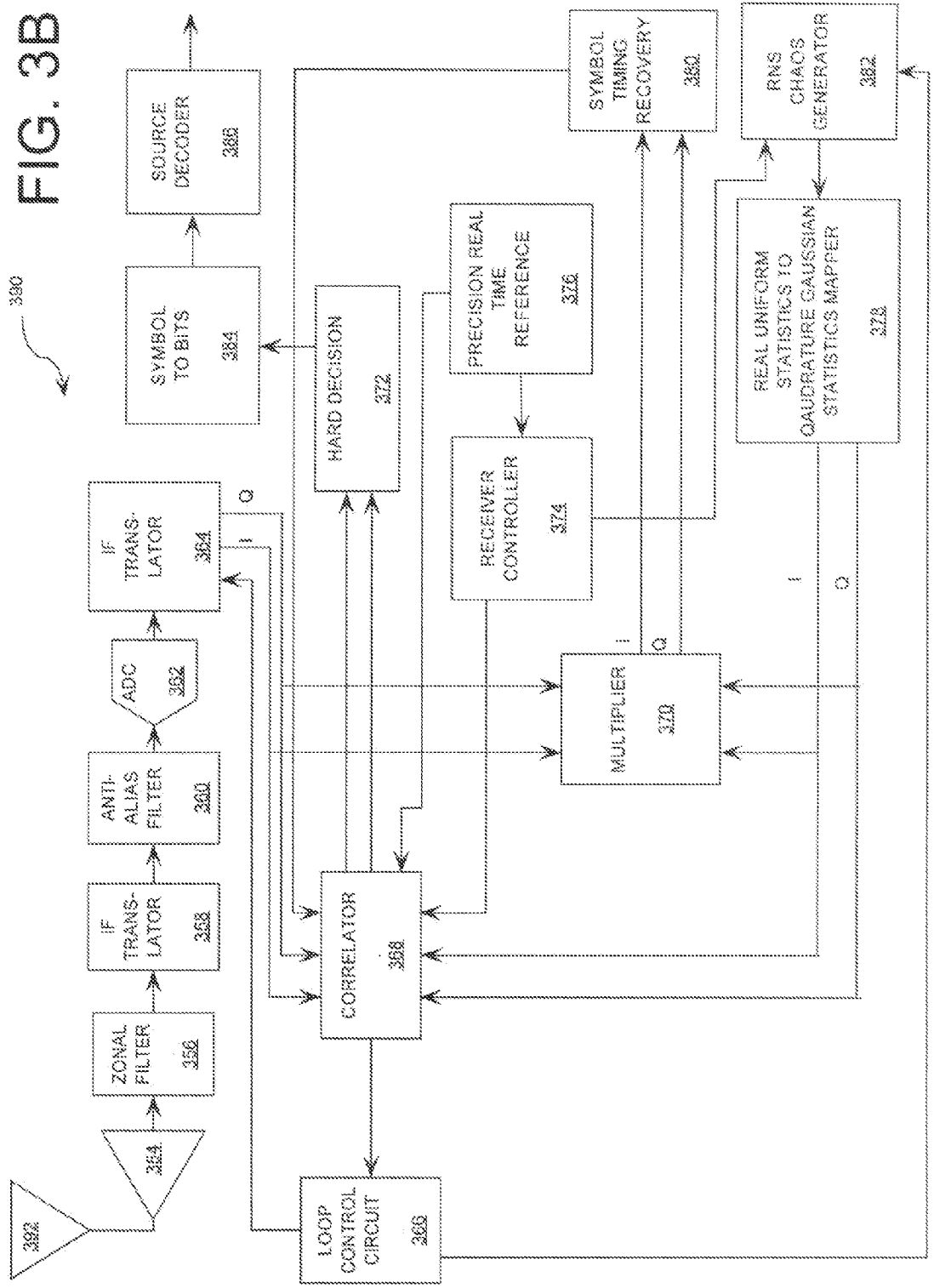

SPREAD SPECTRUM COMMUNICATIONS SYSTEM AND METHOD UTILIZING CHAOTIC SEQUENCE

BACKGROUND OF THE INVENTION

1. Statement of the Technical Field

The invention concerns communications systems. More particularly, the invention concerns a chaotic communications system having a transmitter configured to spread an input data signal over a wide intermediate frequency band, with a corresponding receiver to recover the input data from the spread transmitted signal. This spreading consists of combining an amplitude-and-time-discrete signal with a chaotic sequence.

2. Description of the Related Art

Pseudorandom number generators (PRNG) generally utilize digital logic or a digital computer and one or more algorithms to generate a sequence of numbers. While the output of conventional PRNG may approximate some of the properties of random numbers, they are not truly random. Since the algorithms used for generating pseudorandom sequences are deterministic, such sequences will always be periodic.

Chaotic systems can generally be thought of as systems which vary unpredictably unless all of its properties are known. When measured or observed, chaotic systems do not reveal any discernible regularity or order. Chaotic systems are distinguished by a sensitive dependence on a set of initial conditions and by having an evolution through time and space that appears to be quite random. However, despite its "random" appearance, chaos is a deterministic evolution.

Practically speaking, chaotic signals are extracted from chaotic systems and have random-like, non-periodic properties that are generated deterministically and are distinguishable from pseudo-random signals generated using conventional PRNG devices. In general, a chaotic sequence is one in which the sequence is empirically indistinguishable from true randomness absent some knowledge regarding the algorithm which is generating the chaos.

Some have proposed the use of multiple pseudo-random number generators to generate a digital chaotic-like sequence. However, such systems only produce more complex pseudo-random number sequences that possess all pseudo-random artifacts and no chaotic properties. While certain polynomials can generate chaotic behavior, it is commonly held that arithmetic required to generate chaotic number sequences requires an impractical implementation due to the precisions required.

Communications systems utilizing chaotic sequences offer promise for being the basis of a next generation of low probability of intercept (LPI) waveforms, low probability of detection (LPD) waveforms, and secure waveforms. While many such communications systems have been developed for generating chaotically modulated waveforms, such communications systems suffer from low throughput. The term "throughput" as used herein refers to the amount of data transmitted over a data link during a specific amount of time. This throughput limitation stems from the fact that a chaotic signal is produced by means of a chaotic analog circuit subject to drift.

The throughput limitation with chaos based communication systems can be traced to the way in which chaos generators have been implemented. Chaos generators have been conventionally constructed using analog chaotic circuits. The reason for reliance on analog circuits for this task has been the widely held conventional belief that efficient digital generation of chaos is impossible. Notwithstanding the apparent necessity of using analog type chaos generators, that approach has not been without problems. For example, analog chaos generator circuits are known to drift over time. The term "drift" as used herein refers to a slow long term variation in one or more parameters of a circuit. The problem with such analog circuits is that the inherent drift forces the requirement that state information must be constantly transferred over a communication channel to keep a transmitter and receiver synchronized.

The transmitter and receiver in coherent chaos based communication systems are synchronized by exchanging state information over a data link. Such a synchronization process offers diminishing return because state information must be exchanged more often between the transmitter and the receiver to obtain a high data rate. This high data rate results in a faster relative drift. In effect, state information must be exchanged at an increased rate between the transmitter and receiver to counteract the faster relative drift. Although some analog chaotic communications systems employ a relatively efficient synchronization process, these chaotic communications systems still suffer from low throughput.

The alternative to date has been to implement non-coherent chaotic waveforms. However, non-coherent waveform based communication systems suffer from reduced throughput and error rate performance. In this context, the phrase "non-coherent waveform" means that the receiver is not required to reproduce any synchronized copy of the chaotic signals that have been generated in the transmitter. The phrase "communications using a coherent waveform" means that the receiver is required to reproduce a synchronized copy of the chaotic signals that have been generated in the transmitter.

In view of the forgoing, there is a need for a coherent chaos-based communications system having an increased throughput. There is also a need for a chaos-based communications system configured for generating a signal having chaotic properties. As such, there is further a need for a chaos-based communications system that corrects drift between a transmitter and a receiver without an extreme compromise of throughput.

SUMMARY OF THE INVENTION

A method is provided for coherently modulating and demodulating a chaotic sequence spread spectrum signal. The method includes channel encoding a carrier with information symbols. The method also includes generating an identical string of discrete time chaotic samples at a transmitter and a receiver. The strings of discrete time chaotic samples are generated by selecting a plurality of polynomial equations. The strings of discrete time chaotic samples are also generated using residue number system (RNS) arithmetic operations to respectively and iteratively determine solutions for the polynomial equations. The solutions are iteratively computed and expressed as RNS residue values. The strings of discrete time chaotic samples are further generated by determining a series of digits in the weighted number system based on the RNS residue values. The method further includes modulating the carrier in a chaotic manner using the string of discrete time chaotic samples. Each of the discrete time chaotic samples has a shorter sample time interval than the duration of the information symbols.

The method involves utilizing an accurate time reference to minimize a timing difference uncertainty between each string of discrete time chaotic samples generated at the transmitter and receiver. The method also involves utilizing a signal processing technique to initially synchronize each string of discrete time chaotic samples in time and frequency. The method further involves utilizing a signal processing technique to keep each string of discrete time chaotic samples synchronized in time and frequency for the duration of an information transfer.

According to an embodiment of the invention, the method includes using a Chinese Remainder Theorem process to determine a series of digits in the weighted number system. The series of digits are also determined by identifying a number in the weighted number system that is defined by the RNS residue values. The series of digits are further determined by identifying a truncated portion of a number in the weighted number system that is defined by the RNS residue values. The truncated portion is selected to include any serially arranged set of digits comprising a portion of the number in the weighted number system. The truncated portion is also selected to be exclusive of a most significant digit comprising the number in the weighted number system.

According to another embodiment of the invention, the method includes selecting a value for each of N moduli in a RNS used for solving each of the polynomial equations. The method also includes selecting each modulus for the polynomial equations so that each polynomial equation is irreducible. The method further includes selecting each modulus for the polynomial equations so that solutions iteratively computed via a feedback mechanism for the polynomial equations are chaotic. The method also includes synchronizing the strings of discrete time chaotic samples at the receiver without the need for periodically exchanging state information.

According to another embodiment of the invention, the method includes selecting the polynomial equations to include at least a cubic type polynomial equation. The method also includes selecting each of the polynomial equations to be identical exclusive of a constant value. The method further includes selecting the constant value so that a polynomial equation is irreducible for a predefined modulus. The method includes selecting the polynomial equation to be at least one of a constant or varying function of time.

According to yet another embodiment of the invention, the method includes iteratively computing the solutions using a feedback mechanism. The method also includes selecting the feedback mechanism to include selectively defining a value of a variable of a polynomial equation for each solution iteratively computed. The value is based on a previous iteratively computed solution of the polynomial equation. The weighted number system is a binary number system.

A system for coherently modulating and demodulating a chaotic sequence spread spectrum signal is also provided. The system is comprised of a channel encoder, a chaotic sequence generator, a multiplier, an accurate time reference, and at least one processing means. In the preferred embodiment, the channel encoder is configured to channel encode a carrier responsive to information symbols. The chaotic sequence generator is configured to generate a continuous string of discrete time samples of the chaos. Each of the discrete time samples has a shorter sample time interval than the duration of the information symbols. The chaotic sequence generator is comprised of a computing means and a mapping means. The computing means is configured to use residue number system (RNS) arithmetic operations to respectively determine solutions for the polynomial equations. The solutions are iteratively computed and expressed as RNS residue values. The mapping means is configured to determine a series of digits in the weighted number system based on the RNS residue values.

The multiplier is operatively coupled to the chaotic sequence generator and the channel encoder. The multiplier is configured to modulate the symbol modulated carrier in a chaotic manner using the chaotic string of discrete time samples. The accurate time reference is configured to minimize a timing difference uncertainty between each string of discrete time chaotic samples generated at the transmitter and receiver. The processing means is configured to initially synchronize the strings of discrete time chaotic samples in time and frequency. The processing means is also configured to keep the strings of discrete time chaotic samples synchronized in time and frequency for a duration of an information transfer According to an embodiment of the invention, the mapping means is configured to determine a series of digits in the weighted number system based on the RNS residue values using a Chinese Remainder Theorem process. The mapping means is also configured to identify a number in the weighted number system that is defined by the RNS residue values. The mapping means is further configured to identify a truncated portion of a number in the weighted number system that is defined by the RNS residue values.

According to another embodiment of the invention, the mapping means is configured to select the truncated portion to include any serially arranged set of digits comprising a portion of the number in the weighted number system. The mapping means is also configured to select the truncated portion exclusive of a most significant digit when all possible weighted numbers represented by greater than P−1 bits but less than P bits. P is a fewest number of bits required to achieve a binary representation of the weighted numbers.

According to another embodiment of the invention, the computing means is further configured to utilize a modulus selected for each of the polynomial equations so that each polynomial equation is irreducible. The computing means is also configured to utilize a modulus selected for each of the polynomial equations so that solutions iteratively computed via a feedback mechanism for the polynomial equations are chaotic.

According to another embodiment of the invention, the polynomial equations include at least a cubic type polynomial equation. The polynomial equations are identical exclusive of a constant value. The constant value is selected so that a polynomial equation is irreducible for a predefined modulus. The polynomial equations are at least one of a constant or varying function of time. The chaotic sequence generator is further comprised of a feedback mechanism configured for selectively defining a variable "x" of a polynomial equation as a solution computed in a previous iteration.

BRIEF DESCRIPTION OF THE DRAWINGS

Embodiments will be described with reference to the following drawing figures, in which like numerals represent like items throughout the figures, and in which:

FIG. 3B is a block diagram of another embodiment of the receiver shown in FIG. 1 that is useful for understanding the invention.

DETAILED DESCRIPTION OF THE PREFERRED EMBODIMENTS

An embodiment of the present invention will now be described with respect to FIG. 1 through FIG. 3B. Some embodiments of the present invention provide a coherent chaotic spread-spectrum communications system for phase shift keying (PSK) symbols. The coherent chaotic spread-spectrum communications system's transmitter is configured to generate an output signal having chaotic properties, i.e., an output signal having its frequency spectrum varied over time. It should be appreciated that such a spread-spectrum communications system disclosed herein has many advantages as compared to conventional spread-spectrum communications systems. The spread-spectrum communications system disclosed herein also has many advantages over chaos based spread spectrum systems utilizing analog based chaotic sequence generators. The spread-spectrum communications system disclosed herein corrects drift between a transmitter and a receiver without an extreme compromise of throughput.

The communication system disclosed herein utilizes a coherent chaotic sequence spread spectrum (CCSSS) method. Prior to being transmitted, data symbols are combined with a higher rate chaotic sequence (analogous to the binary PN spreading sequence known as a chipping code in traditional direct sequence spread spectrum systems) that spreads the spectrum of the data according to a spreading ratio. The resulting signal resembles a truly random signal but this randomness can be removed at the receiving end to recover the original data. In particular, the data is recovered by despreading the received signal using the same chaotic sequence which is generated at a receiver. The CCSSS system in relation to FIGS. 1 through 3B channel encodes a baseband carrier with PSK symbols. The channel encoding is one of two operations commonly known as modulation. The other operation commonly known as modulation is mixing times a local oscillator or other sequence which results in frequency translation and is also used herein. The CCSSS system also modulates the phase modulated carrier in a chaotic manner utilizing a string of discrete time chaotic samples. The discrete time chaotic samples shall hereinafter be referred to as "chips". As will be appreciated by those familiar with direct sequence spread spectrum (DSSS) systems, each chip will generally have a much shorter sample time interval than the duration of each of the information symbols. Thus it will be understood that the carrier is modulated using the chaotic sequence chips. Moreover, it will be understood that the chip rate associated with the chaotic sequence is much higher than the symbol rate. It should also be understood that the chaotic sequence of chips which are utilized for generating the transmitted signal is known a priori by the receiver. Consequently, the same chaotic sequence can be used at the receiver to reconstruct the non-spread carrier or remove the effect of spreading at the receiver.

Figure 1:
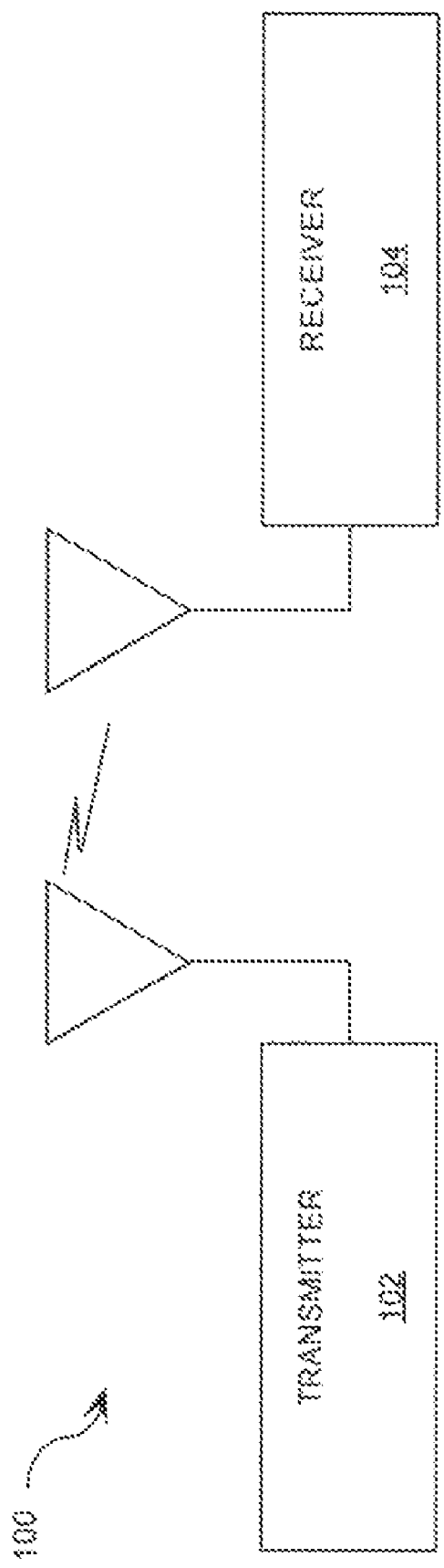
FIG. 1 is a block diagram of a coherent chaotic spread-spectrum communication system that is useful for understanding the invention.

Referring now to FIG. 1, there is provided a coherent chaotic spread-spectrum communication system 100 that is useful for understanding the present invention. The coherent chaotic spread-spectrum communication system 100 is comprised of a transmitter 102 and a receiver 104. The transmitter 102 is configured to generate an amplitude-and-time-discrete baseband signal and to spread the amplitude-and-time-discrete baseband signal over a wide intermediate frequency band. This spreading consists of multiplying the amplitude-and-time-discrete baseband signal by a digital chaotic sequence. The product of this arithmetic operation is hereinafter referred to as a digital chaotic signal. In this regard, it should be understood that the transmitter 102 is also configured to process the digital chaotic signal to place the same in a proper analog form suitable for transmission over a communications link. The transmitter 102 is further configured to communicate analog chaotic signals to the receiver 104 via a communications link. The transmitter 102 will be described in greater detail below in relation to FIG. 2.

The receiver 104 is configured to receive transmitted analog chaotic signals from the transmitter 102. The receiver 104 is also configured to down convert, digitize, and de-spread a transmitted analog chaotic signal by correlating it with a replica of the chaotic sequence generated at the transmitter 102. The chaotic sequence is also time synchronized to the transmitted analog chaotic signal: i.e., a sampling rate of the chaotic sequence is the same as a sampling rate of the transmitted analog chaotic signal and is synchronized with a clock (not shown) of the transmitter 102. The output of the arithmetic operation that de-spreads the received signal is hereinafter referred to as a de-spread signal. In this regard, it should be understood that the receiver 104 is further configured to process a de-spread signal for obtaining data contained therein The receiver 104 is configured to convert the data into text, sound, pictures, navigational-position information, and/or any other type of useful payload information that can be communicated. The receiver 104 is described in greater detail below in relation to FIGS. 3A and 3B.

Figure 2:
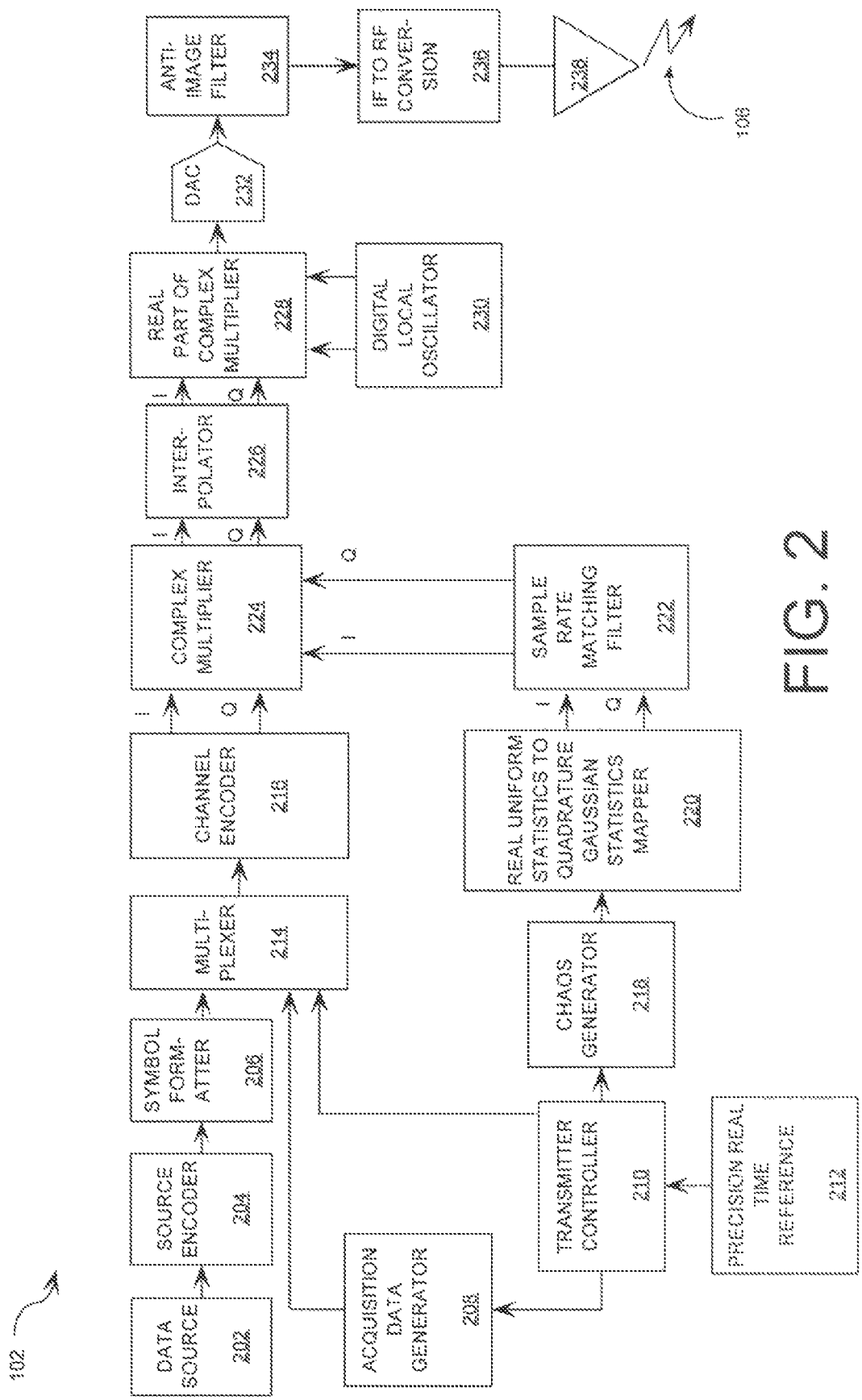
FIG. 2 is a block diagram of the transmitter shown in FIG. 1 that is useful for understanding the invention.

Referring now to FIG. 2, there is provided a bock diagram of the transmitter 102 shown in FIG. 1 that is useful for understanding the invention. It should be noted that the embodiment of FIG. 2 assumes that: (1) a low order phase shift keying (PSK) data modulation is used; (2) no pulse shaping is applied to data symbols; (3) modulated data symbols are generated in quadrature form; and (4) chaotic spectral spreading is performed at an intermediate frequency (IF).

Referring again to FIG. 2, the transmitter 102 is comprised of a data source 202. The transmitter 102 is also comprised of a source encoder 204, a symbol formatter 206, an acquisition data generator 208, a transmitter controller 210, a multiplexer 214, a channel encoder 218, a precision real time reference 212, and a digital complex multiplier 224. The transmitter 102 is further comprised of a chaos generator 218, a real uniform statistics to quadrature Gaussian statistics mapper device (RUQG) 220, and a sample rate matching filter (SRMF) 222. The transmitter 102 is further comprised of an interpolator 226, a digital local oscillator (LO) 230, a real part of a complex multiplier 228, a digital-to-analog converter (DAC) 232, an anti-image filter 234, an intermediate frequency (IF) to radio frequency (RF) conversion device 236, and an antenna element 238. Each of the above listed components 202-216, 220-238 are well known to persons skilled in the art. Thus, these components will not be described in great detail herein. However, a brief discussion of the transmitter 102 architecture is provided to assist a reader in understanding the present invention.

Referring again to FIG. 2, the data source 202 is configured to receive bits of data from an external data source (not shown) as bits of data. In this regard, it should be appreciated that the data source 202 is an interface configured for receiving an input signal containing data from an external device (not shown). The data source 202 is further configured to supply bits of data to the source encoder 204 at a particular data transfer rate. The source encoder 204 can be configured to encode the data received from the external device (not shown) using a forward error correction coding scheme. The bits of data received at or generated by the source encoder 204 represent any type of information that may be of interest to a user. For example, the data can be used to represent text, telemetry, audio, or video data. The source encoder 204 is further configured to supply bits of data to the symbol formatter 206 at a particular data transfer rate.

The symbol formatter 206 is configured to process bits of data for forming channel encoded symbols. In a preferred embodiment, the source encoded symbols are phase shift keyed (PSK) encoded. If it is desired to use a non-coherent form of PSK with the coherent chaos spread spectrum system, then the symbol formatter 204 can also be configured to differentially encode formed PSK symbols. Differential encoding is well known to persons skilled in the art and therefore will not be described in great detail herein. The symbol formatter 206 can be further configured to communicate non-differentially encoded PSK symbols and/or differentially encoded PSK symbols to the multiplexer 214. Still, the invention is not limited in this regard.

According to an embodiment of the invention, the symbol formatter 206 is functionally similar to a serial in/parallel out shift register where the number of parallel bits is equal to log base two ($\log_2$) of the order of the channel encoder 216. In this regard, the symbol formatter 206 is selected for use with a quadrature phase shift keying (QPSK) modulator. As such, the symbol formatter 206 is configured to perform a QPSK formatting function for grouping two (2) bits of data together to form a QPSK symbol (i.e., a single two bit parallel word). Thereafter, the symbol formatter 206 communicates the encoded QPSK symbol to the multiplexer 214. Still, the invention is not limited in this regard.

According to another embodiment of the invention, the symbol formatter 206 is functionally similar to a serial in/parallel out shift register where the number of parallel bits out is equal to log base two ($\log_2$) of the order of the channel encoder 216. In this regard, the symbol formatter 206 is selected for use with a binary phase shift keying (BPSK) modulator. As such, the symbol formatter 206 is configured to map one bit of data to a BPSK symbol. Thereafter, the symbol formatter 206 communicates the BPSK symbol to the multiplexer 214. Still, the invention is not limited in this regard.

According to another embodiment of the invention, the symbol formatter 206 is selected for use with a sixteen quadrature amplitude modulation (16 QAM) modulator. As such, the symbol formatter 206 is configured to map four (4) bits to a 16 QAM symbol. Thereafter, the symbol formatter 206 communicates the 16 QAM symbol to the multiplexer 214. Still, the invention is not limited in this regard.

According to another embodiment of the invention, the symbol formatter 206 is selected for use with a binary amplitude shift keying (ASK) modulator. As such, the symbol formatter 206 is configured to map one bit of data to a ASK symbol. Thereafter, the symbol formatter 206 communicates the ASK symbol to the multiplexer 214. Still, the invention is not limited in this regard.

The transmitter 102 also includes an acquisition data generator 208 capable of generating a "known data preamble" that can be used to enable initial synchronization of a chaotic sequence generated in the transmitter 102 and the receiver 104. The duration of this "known data preamble" is determined by an amount required by the receiver 104 to synchronize with the transmitter 102 under known worst case channel conditions. In some embodiments of the invention, the "known data preamble" is a repetition of the same known symbol. In other embodiments of the invention, the "known data preamble" is a series of known symbols. The acquisition data generator 208 can be further configured to communicate the "known data preamble" to the multiplexer 214.

Referring again to FIG. 2, the multiplexer 214 is configured to receive the binary word to be modulated by the channel encoder from the symbol formatter 206. The multiplexer 214 is also configured to receive a "known data preamble" from the acquisition data generator 208. The multiplexer 214 is coupled to the transmitter controller 210. The transmitter controller 210 is configured to control the multiplexer 214 so that the multiplexer 214 routes the "known data preamble" to the channel encoder 216 at the time of a new transmission.

According to an alternative embodiment of the invention, the "known data preamble" is stored in a modulated form. In such a scenario, the architecture of FIG. 2 is modified such that the multiplexer 214 exists after the channel encoder 216. Still, the invention is not limited in this regard.

According to another embodiment of the invention, the "known data preamble" may be injected at known intervals to aid in periodic synchronization of the chaotic sequence generated in the transmitter 102 and the receiver 104. This would typically be the case for an implementation meant to operate in harsh channel conditions. Still, the invention is not limited in this regard.

Referring again to FIG. 2, the multiplexer 214 is configured to select the data symbols to be routed to the channel encoder 216 after a preamble period has expired. The multiplexer 214 is also configured to communicate the data symbols to the channel encoder 216. In this regard, it should be appreciated that a communication of the data symbols to the channel encoder 216 is delayed by a time defined by the length of the "known data preamble." As should be appreciated, this delay allows all of a "known data preamble" to be fully communicated to the channel encoder 216 prior to communication of the data symbols.

Referring again to FIG. 2, the channel encoder 216 is configured to perform actions for representing the "known data preamble" and the data symbols in the form of a modulated amplitude-and-time-discrete digital signal. The modulated amplitude-and-time-discrete digital signal is defined by digital words which represent intermediate frequency (IF) modulated symbols comprised of bits of data having a one (1) value or a zero (0) value. Methods for representing digital symbols by an amplitude-and-time-discrete digital signal are well known to persons skilled in the art. Thus, such methods will not be described in great detail herein. However, it should be appreciated that the channel encoder 216 can employ any such method. For example, the channel encoder 216 can be selected as a digital baseband modulator employing quadrature phase shift keying (QPSK). As will be appreciated by those skilled in the art, the output of the QPSK modulator will include an in-phase ("I") data and quadrature phase ("G") data. The I and Q data will be thereafter communicated to the digital complex multiplier 224.

According to an embodiment of the invention, the transmitter 102 is further comprised of a sample rate matching device (not shown) between the channel encoder 216 and the digital complex multiplier 224. The sample rate matching device (not shown) is provided for resampling the amplitude-and-time-discrete digital signal. As should be appreciated, the sample rate matching device (not shown) performs a sample rate increase on the amplitude-and-time-discrete digital signal so that a sample rate of the amplitude-and-time-discrete digital signal is the same as a digital chaotic sequence communicated to the digital complex multiplier 224. Still, the invention is not limited in this regard.

Referring again to FIG. 2, the digital complex multiplier 224 performs a complex multiplication in the digital domain. In the digital complex multiplier 224, the amplitude-and-time-discrete digital signal from the channel encoder 216 is multiplied by a digital representation of a chaotic sequence. The chaotic sequence is generated in the chaos generator 218. The rate at which the digital chaotic sequence is generated is an integer multiple of a data symbol rate. The greater the ratio between the data symbol period and the sample period of the digital chaotic sequence, the higher a spreading gain. The chaos generator 218 communicates the chaotic sequence to a RUQG 220. The RUQG 220 is configured to statistically transform a digital chaotic sequence into a transformed digital chaotic sequence with pre-determined statistical properties. The transformed digital chaotic sequence can have a characteristic form including combinations of real, complex, or quadrature, being of different word widths, and having different statistical distributions. For example, the RUQG 220 may take in two (2) uniformly distributed real inputs from the chaos generator 218 and convert those via a complex-valued bivariate Gaussian transformation to a quadrature output having statistical characteristics of a Guassian distribution. Such conversions are well understood by those skilled in the art, and therefore will not be described in great detail herein. However, it should be understood that such techniques may use nonlinear processors, look-up tables, iterative processing (CORDIC functions), or other similar mathematical processes. The RUQG 220 is further configured to communicate transformed chaotic sequences to the SRMF 222.

The statistically transformed output of the digital chaotic sequence has a multi-bit resolution consistent with a resolution of the DAC 232. The RUQG 220 communicates the statistically transformed output of the digital chaotic sequence to the SRMF 222. For example, the RUQG 220 communicates an in-phase ("I") data and quadrature phase ("Q") data to the SRMF 222 when the channel encoder 216 is configured to yield a complex output representation. Still, the invention is not limited in this regard.

If a chaos sample rate of the transformed chaotic sequence is different than a sample rate of the amplitude-and-time-discrete digital signal, then the two rates must be matched. The chaotic sequence can therefore be resampled in the SRMF 222. For example, SRMF 222 can be comprised of a real sample rate matching filter to resample each of the in-phase and quadrature-phase processing paths of the chaotic sequence. As should be appreciated, the SRMF 222 performs a sample rate change on the transformed digital chaotic sequence so that a sample rate of the transformed digital chaotic sequence is the same as an amplitude-and-time-discrete digital signal communicated to the digital complex multiplier 224 from the channel encoder 216. The SRMF 222 is also configured to communicate a resampled, transformed digital chaotic sequence to the digital complex multiplier 224.

According to an embodiment of the invention, the RUQG 220 statistically transforms a digital chaotic sequence into a quadrature Gaussian form of the digital chaotic sequence. This statistical transformation is achieved via a nonlinear processor that combines lookup tables and embedded computational logic to implement the conversion of two (2) independent uniformly distributed random variables into a quadrature pair of Gaussian distributed variables. One such structure for this conversion is as shown in the mathematical expressions (1) and (2).

$$G_1 = \sqrt{-2\log(u_1)} \cdot \cos(2\pi u_2) \quad (1)$$

$$G_2 = \sqrt{-2\log(u_1)} \cdot \sin(2\pi u_2) \quad (2)$$

where $\{u_1, u_2\}$ are uniformly distributed independent input random variables and $\{G_1, G_2\}$ are Gaussian distributed output random variables. In such a scenario, the SRMF 222 is comprised of one sample rate matching filter to resample an in-phase ("I") data sequence and a second sample rate matching filter to resample a quadrature-phase ("Q") data sequence. The SRMF 222 is configured to communicate a resampled, transformed digital chaotic sequence to the digital complex multiplier 224. More particularly, the SRMF 222 communicates an in-phase ("I") data and quadrature phase ("Q") data to the digital complex multiplier 224. Still, the invention is not limited in this regard.

According to another embodiment of the invention, the amplitude-and-time-discrete digital signal and the digital chaotic sequence are generated as zero intermediate frequency (IF) signals. Also, pulse shaping is not employed. In such a scenario, the sample rate matching device (not shown) between the channel encoder 216 and the digital complex multiplier 224 is not required. Still, the invention is not limited in this regard.

The digital complex multiplier 224 performs a complex multiplication on the digital chaotic sequence output from the SRMF 222 and the amplitude-and-time-discrete digital signal output from the channel encoder 216. The resulting output is a digital representation of a coherent chaotic sequence spread spectrum modulated IF signal in which the digital data from the channel encoder 216 has been spread over a wide frequency bandwidth in accordance with a chaotic sequence generated by the chaos generator 218.

The digital complex multiplier 224 is configured to combine a digital chaotic sequence with an amplitude-and-time-discrete digital signal using an arithmetic operation. The arithmetic operation is selected as a complex-valued digital multiplication operation. The complex-valued digital multiplication operation includes multiplying the amplitude-and-time-discrete digital signal by the digital chaotic sequence to obtain a digital chaotic output signal. The digital complex multiplier 224 is also configured to communicate digital chaotic output signals to the interpolator 226.

The interpolator 226, real part of complex multiplier 228 and quadrature digital local oscillator 230 operate in tandem to form an intermediate frequency (IF) translator which frequency modulates a quadrature first intermediate frequency (IF) signal received from the complex multiplier to a second real intermediate frequency (IF) signal. Such digital intermediate frequency (IF) translators are known to those skilled in the art and shall not be discussed in detail here.

The interpolator 226 accepts an input from the complex multiplier 224. In a preferred embodiment the modulated symbols are in quadrature form and the interpolator is implemented as two real interpolators. Still, the invention is not limited in this regard.

The interpolator 226 raises the sample rate of the amplitude-and-time-discrete digital signal received from the complex multiplier 224 to a rate compatible with the bandwidth and center frequency of the second IF. The digital local oscillator 230 generates a complex quadrature amplitude-and-time-discrete digital sinusoid at a frequency which shall translate the first intermediate frequency (IF) to a desired second intermediate frequency (IF). The digital local oscillator 230 is also configured to pass its output to the real part of complex multiplier 228.

The real part of complex multiplier 228 is configured to accept as its inputs the quadrature output of the interpolator 228 and the quadrature output of the digital local oscillator 230. The real part of a complex multiplication is passed so that the real part of complex multiplier 228 implements only the real output portion of a complex multiplication. The real part of complex multiplier 228 is configured to pass its output to the DAC 232. Still, the invention is not limited in this regard.

According to an embodiment of the invention, the digital chaotic sequence and the amplitude-and-time-discrete digital signal are zero intermediate frequency (IF) signals. The digital chaotic sequence is used to amplitude modulate the "known data preamble" and the data symbols via an efficient instantiation of a complex multiplier. The result of this amplitude modulation process is a zero IF signal. Still, the invention is not limited in this regard.

Referring again to FIG. 2, the IF translator and specifically the real part of the complex multiplier 228 are configured to communicate a sampled digital chaotic output signal (i.e., a digital chaotic output signal having an increased sampling rate and non-zero intermediate frequency) to the DAC 232. The DAC 232 is configured to convert a sampled digital chaotic output signal to an analog signal. The DAC 232 is also configured to communicate an analog signal to the anti-image filter 234.

In some applications, it can be desirable to change a sampling rate at the output of the digital complex multiplier 224 only, for example when using an interpolating DAC. An IF translator consisting of an interpolator 226 only can be provided for this purpose.

According to an embodiment of the invention, the digital complex multiplier 224 multiplies I and Q data of an amplitude-and-time-discrete digital signal by I and Q data of digital chaotic sequence to obtain a digital chaotic output signal. The digital chaotic output signal is a quadrature, zero IF signal. The digital complex multiplier 224 communicates the quadrature, zero IF signal to the IF translator. The IF translator is an interpolation filter 226 only. The interpolation filter 226 is comprised of dual real interpolators which change the sample rate of the quadrature, zero IF signal to a predetermined rate, such as seventy (70) mega sample per second. The interpolation filter 226 communicates the sampled, quadrature, zero IF signal to the DAC 232. The DAC 232 is an interpolating DAC that increases the effective sample rate. According to an embodiment of the invention, the DAC 232 interpolates the received zero IF signal to a two hundred eighty (280) mega sample per second sample rate. The DAC 232 also up converts a real output component by a factor of the interpolated sample frequency (two hundred eighty (280) mega sample per second) divided four (4) before conversion to an analog signal. The output of the DAC 232 is thus a real signal centered at a seventy (70) mega hertz intermediate frequency with a first image centered at two hundred ten (210) mega hertz. Still, the invention is not limited in this regard.

Referring again to FIG. 2, the anti-image filter 234 is configured to remove spectral images from the analog signal to form a smooth time domain signal. The anti-image filter 234 is also configured to communicate a smooth time domain signal to a RF translator 236. The RF translator 236 is a wide bandwidth analog IF to RF up converter. The RF translator 236 is configured to center a smooth time domain signal at an RF for transmission thereby forming an RF signal. The RF translator 236 is also configured to communicate the RF signal to the power amplifier (not shown). The power amplifier (not shown) is configured to amplify a received RF signal. The power amplifier (not shown) is configured to communicate the amplified RF signal to the antenna element 238 for communication to a receiver 104 (described below in relation to FIG. 3A).

It should be understood that the digital generation of the digital chaotic sequence at the transmitter 102 and receiver 104 is kept closely coordinated under the control of a precision real time reference 212 clock. The higher the precision of the clock 212, the closer the synchronization of the chaos generator 218 of the transmitter 102 and the chaos generator (described below in relation to FIG. 3A) of the receiver 104 shall be excluding the effects of processing delay differences and channel propagation times. The use of a precision real time reference allows the states of the chaos generators to be easily controlled with precision.

Referring again to FIG. 2, the precision real time reference 212 is a stable local oscillator locked to a precision real time reference, such as a GPS clock receiver or a chip scale atomic clock (CSAC). The precision real time reference 212 is configured to supply a high frequency clock to the clocked logic circuits 206 through 232 while being locked to a lower frequency reference clock. The lower frequency reference clock supplies a common reference and a common real time of day reference to prevent a large drift between the states of the chaos generator 218 and the chaos generator (described below in relation to FIG. 3A) of the receiver 104 over an extended time interval.

A person skilled in the art will appreciate that the transmitter 102 is one architecture of a communications system transmitter. However, the invention is not limited in this regard and any other transmitter architecture can be used without limitation. For example, the transmitter 102 can include real first to second intermediate frequency (IF) translation instead of a quadrature first to second intermediate frequency (IF) translation. As another example, other architectures may employ additional chaotic sequence generators to provide a switched chaotic output or to control other aspects of the transmitter 102.

Figure 3A:
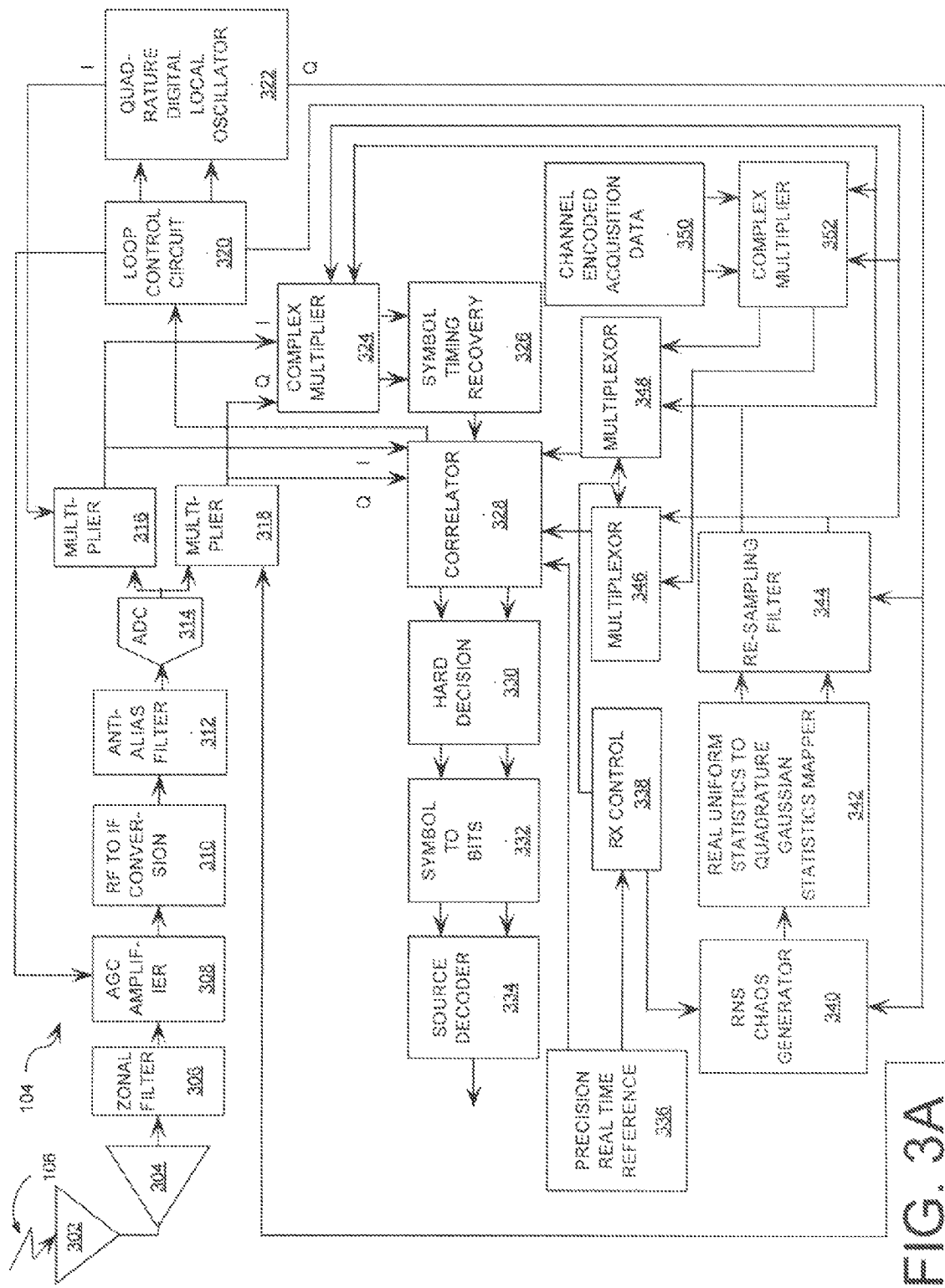
FIG. 3A is a block diagram of an embodiment of the receiver shown in FIG. 1 that is useful for understanding the invention.

Referring now to FIG. 3A, there is provided a block diagram of the receiver 104 of FIG. 1 that is useful for understanding the invention. It should be noted that in conventional analog based coherent communications systems analog chaos circuits are synchronized by periodically exchanging state information. The exchange of state information requires a substantial amount of additional bandwidth. This is what makes analog based coherent communications impracticable. The receiver 104 of FIG. 3A is designed to eliminate the drawbacks of conventional analog based coherent communications systems, in this regard it should be appreciated that the receiver 104 is comprised of a digital chaos generator. The receiver 104 includes a tracking loop for synchronizing it's digital chaos generator and the digital chaos generator 213 of the transmitter 102. Most significantly, the receiver is configured to synchronize two (2) strings of discrete time chaotic samples (i.e., chaotic sequences) without using a constant or periodic transfer of state update information. A first string of discrete time chaotic samples is generated at the transmitter 102. A second string of discrete time chaotic samples is generated at the receiver 104.

Referring again to FIG. 3A, the receiver 104 is comprised of an antenna element 302, a low noise amplifier (LNA) 304, a zonal filter 306, an AGC amplifier 308, a radio frequency (RF) to intermediate frequency (IF) conversion device 310, an anti-alias filter 312, and an analog-to-digital (A/D) converter 314. The receiver 104 is also comprised of real multipliers 316, 318, a loop control circuit 320, a quadrature digital local oscillator 322, a correlator 328, a multiplexers 346, 348, a channel encoded acquisition data generator (CEADG) 350, digital complex multipliers 324, 352, and a symbol timing recovery circuit 326. The receiver 104 is further comprised of a receiver controller 338, a precision real time reference clock 336, a hard decision device 330, a symbol to bits (S/B) converter 332, and a source decoder 334. The receiver 104 is comprised of a chaos generator 340, a real uniform statistic to quadrature Gaussian statistic mapper (RUQG) 342, and a re-sampling filter 344. Each of the above listed components and circuits 302-318, 322-326, 330-338, 342-352 are well known to persons skilled in the art. Thus, these components and circuits will not be described in great detail herein. However, a brief discussion of the receiver 104 architecture is provided to assist a reader in understanding the present invention. It should be noted that when the receiver 104 is in both acquisition and tracking modes (described below) the receiver 104 is utilizing a novel architecture/algorithm.

Referring again to FIG. 3A, the antenna element 302 is configured to receive an analog input signal communicated from the transmitter 102 over a communications link. The antenna element 302 is also configured to communicate the analog input signal to the LNA 304. The LNA 304 is configured to amplify a received analog input signal while adding as little noise and distortion as possible. The LNA 304 is also configured to communicate an amplified, analog input signal to the zonal filer 306. Zonal filters are analog filters with slow roll off characteristic but low injection loss used to suppress large interfering signals outside of bands of interest. Zonal filters are well known to persons skilled in the art, and therefore will not be described in great detail herein. It should be appreciated that the zonal filter 306 is configured to communicate a filtered, analog input signal to the automatic gain control (AGC) amplifier 308. An automatic gain control (AGC) amplifier 308 is a controllable gain amplifier used to keep the magnitude of the received signal within normal bounds for the rest of the signal processing chain. Automatic gain control (AGC) amplifiers are well known to persons skilled in the art, and therefore will not be described in great detail herein. It should be appreciated that the automatic gain control (AGC) amplifier 308 is configured to communicate a gain adjusted, analog input signal to the RF to IF conversion device 310.

The RF to IF conversion device 310 is configured to mix the analog input signal to a preferred IF for conversion to a digital signal at the A/D converter 314. The RF to IF conversion device 310 is also configured to communicate a mixed analog input signal to the anti-alias filter 312. The anti-alias filter 312 is configured to restrict a bandwidth of a mixed analog input signal. The anti-alias filter 312 is also configured to communicate a filtered, analog input signal to the A/D converter 314. The A/D converter 314 is configured to convert a received analog input signal to a digital signal. The A/D converter 314 is also configured to communicate a digital input signal to a second IF translator which is comprised of the real multipliers 316, 318, and the programmable quadrature digital local oscillator 332.

The multiplier 316 is configured to receive a digital word as input from the A/D converter 314 and a digital word from the in-phase component of the quadrature digital local oscillator 322. The multiplier 316 multiplies the output of the A/O converter 314 by the in-phase component of the quadrature digital local oscillator 322. The multiplier 316 is also configured to communicate a digital output word. The multiplier 318 is configured to receive a digital word as input from the A/D converter 314 and a digital word from the quadrature-phase component of the quadrature digital local oscillator 322. The multiplier 318 multiplies the output of the A/D converter 314 by the quadrature-phase component of the quadrature digital local oscillator 322. The multiplier 318 is also configured to communicate a digital output word.

The quadrature digital local oscillator 322 generates a complex quadrature amplitude-and-time-discrete digital sinusoid at a frequency which shall translate the first IF to baseband and remove detected frequency and phase offsets in the resulting quadrature baseband signal. The quadrature digital local oscillator accepts as its inputs a binary phase control word and a binary frequency control word from the loop control circuit 320. Quadrature digital local oscillators are known to those skilled in the art, and therefore will not he described in detail herein.

The IF translator is configured to mix the digital input signal to a preferred IF for processing at the correlator 328 and the digital complex multiplier 324. The IF translator is also configured to communicate a digital input signal to the correlator 328 and the digital complex multiplier 324. As will be appreciated by those skilled in the art, the output of the IF translator can include an in-phase ("I") data and quadrature phase ("Q") data. As such, the IF translator can communicate I and Q data to the correlator 328 and the digital complex multiplier 324.

The digital complex multiplier 324 is configured to perform a complex multiplication in the digital domain. In the complex-valued digital multiplier 324, the digital input signal from the IF translator is multiplied by a digital representation of a chaotic sequence. The chaotic sequence is generated in the chaos generator 340. The chaos generator 340 communicates the chaotic sequence to an RUQG 342. In this regard, it should he appreciated that the chaos generator 340 is coupled to the receiver controller 338. The receiver controller 338 is configured to control the chaos generator 340 so that the chaos generator 340 generates a chaotic sequence with the correct initial state when the receiver 104 is in an acquisition mode and a tracking mode.

The RUQG 342 is configured to statistically transform a digital chaotic sequence into a transformed digital chaotic sequence. The transformed digital chaotic sequence can have a characteristic form including combinations of real, complex, or quadrature, being of different word widths, and having different statistical distributions. One such statistical transformation used in the preferred embodiment is a bivariate Gaussian distribution that converts two (2) independent uniformly distributed random variables to a pair of quadrature Gaussian distributed variables. The RUQG 342 is further configured to communicate transformed chaotic sequences to the re-sampling filter 344.

According to the embodiment of the invention, the RUQG 342 statistically transforms a digital chaotic sequence into a quadrature Gaussian form of the digital chaotic sequence. The RUQG 342 communicates the quadrature Gaussian form of the digital chaotic sequence to the re-sampling filter 344. More particularly, the RUQG 342 communicates an in-phase ("I") data and quadrature phase ("Q") data to the re-sampling filter 344. Still, the invention is not limited in this regard.

The re-sampling filter 344 is also configured to forward a transformed chaotic sequence to the digital complex multiplier 324. The re-sampling filter 344 is configured as a sample rate change filter for making the chaos sample rate compatible with the received signal sample rate when the receiver 104 is in acquisition mode. The re-sampling filter 344 is also configured to compensate for transmit and receive clock offsets with less than a certain level of distortion when the receiver is in a steady state demodulation mode. In this regard, it should be appreciated that the re-sampling filter 344 is configured to convert a sampling rate of in-phase ("I") and quadrature-phase ("Q") data sequences from a first sampling rate to a second sampling rate without changing the spectrum of the data contained in therein. The re-sampling filter 344 is further configured to communicate in-phase ("I") and quadrature-phase ("Q") data sequences to the digital complex multipliers 324, 352, and the multiplexers 346, 348.

It should be noted that if a sampled form of a chaotic sequence is thought of as discrete samples of a continuous band limited chaos then the re-sampling filter 344 is effectively tracking the discrete time samples, computing a continuous representation of the chaotic sequence, and resampling the chaotic sequence at the discrete time points required to match the discrete time points sampled by the A/D converter 314. In effect, input values and output values of the re-sampling filter 344 are not exactly the same because the values are samples of the same waveform taken at slightly offset times. However, the values are samples of the same waveform so the values have the same power spectral density.

Referring again to FIG. 3A, the CEADG 350 is configured to generate a modulated acquisition sequence. The CEADG 350 is also configured to communicate a modulated acquisition sequence to the digital complex multiplier 352. The digital complex multiplier 352 is configured to perform a complex multiplication in the digital domain. This complex multiplication includes multiplying a modulated acquisition sequence from the CEADG 350 by a digital representation of a chaotic sequence to yield a reference for a digital input signal. The digital complex multiplier 352 is also configured to communicate reference signal to the multiplexers 346, 348. The multiplexer 346 is configured to route the quadrature-phase part of a reference signal to the correlator 328. The multiplexer 348 is configured to route the in-phase part of a reference signal to the correlator 328. In this regard, it should be appreciated that the multiplexers 346, 348 are coupled to the receiver controller 338. The receiver controller 338 is configured to control the multiplexers 346, 348 in tandem so that the multiplexers 346, 348 route the reference signal to the correlator 328 while the receiver 104 is in an acquisition mode (described below).

The correlator 328 is configured to correlate a chaotic sequence with a digital input signal. In this regard, it should be understood that, the sense of the real and imaginary components of the correlation is directly related to the values of the real and imaginary components of the symbols of a digital input signal. It should also be understood that, in a preferred embodiment, the sense of the real and imaginary components of the correlation is directly related to the values of the real and imaginary components of the PSK symbols of a digital input signal. Thus, when the correlator 328 is in a steady state demodulation mode the output of the correlator 328 is PSK symbol soft decisions. In this regard, it should be appreciated that soft information refers to soft-values (which are represented by soft-decision bits) that comprise information about the bits contained in a sequence. In particular, soft-values are values that represent the probability that a particular bit in a sequence is either a one (1) or a zero (0). For example, a soft-value for a particular bit can indicate that a probability of a bit being a one (1) is p(1)=0.3. Conversely, the same bit can have a probability of being a zero (0) which is p(0)=0.7.

The correlator 328 is also configured to communicate PSK soft decisions to the hard decision device 330 for final symbol decision making. The hard decision device 330 is configured to communicate symbol decisions to the S/B converter 332. The S/B converter 332 is configured to convert symbols to a binary form. The S/B converter 332 is configured to communicate a binary data sequence to the source decoder 334. The source decoder 334 is configured to decode FEC applied at the transmitter and to pass the decoded bit stream to one or more external devices (not shown) utilizing the decoded data.

The correlator 328 is also configured to acquire initial timing information associated with a chaotic sequence, initial timing associated with a data sequence and to track phase and frequency offset information between the chaotic sequence and a digital input signal. The correlator 328 is also configured to track input signal magnitude information between the chaotic sequence and a digital input signal. Acquisition of initial timing information and tracking of input signal magnitude, phase and frequency offset information are both standard functions in digital communication systems. As such, methods for acquiring initial timing information and tracking phase and frequency offset information are well known to persons skilled in the art and therefore will not be described in detail herein. However, it should be appreciated that any such method can be used without limitation.

Referring again to FIG. 3A, the correlator 328 is configured to communicate the magnitude and phase information as a function of time to the loop control circuit 320. The loop control circuit 320 uses the magnitude and phase information to calculate the deviation of the input signal magnitude from a nominal range, and phase and frequency offset information to synchronize a chaotic sequence with a digital input signal. The loop control circuit 320 is also configured to communicate the phase and frequency offset information to the quadrature digital local oscillator 322 portion of the IF translator and gain deviation compensation information to the automatic gain control (AGC) amplifier 308. The loop control circuit 320 is further configured to communicate a retiming control signal to the re-sampling filter SRMD 344 and the chaos generator 340.

It should be understood that the digital generation of the digital chaotic sequence at the transmitter 102 and receiver 104 is kept closely coordinated under the control of a precision real time reference clock 336. The higher the precision of the clock 336, the closer the synchronization of the chaos generator 218 of the transmitter 102 and the chaos generator 340 of the receiver 104 shall be excluding the effects of processing delay differences and channel propagation times. It is the use of digital chaos generators 218, 340 that allow the states of the chaos generators to be easily controlled with precision, thus allowing coherent communication.

Referring again to FIG. 3A, the precision real time reference clock 336 is a stable local oscillator locked to a precision real time reference, such as a GPS clock receiver or a chip scale atomic clock (CSAC). The precision real time reference clock 336 is configured to supply a high frequency clock to the clocked logic circuits 314, . . . , 352 while being locked to a lower frequency reference clock. The lower frequency reference clock supplies a common reference and a common real time of day reference to prevent a large drift between the states of the chaos generator 218 and the chaos generator 340 of the receiver 104 over an extended time interval.

The operation of the receiver 104 will now be briefly described with regard to an acquisition mode and a steady state demodulation mode.

Acquisition Mode:

In acquisition mode, the re-sampling filter 344 performs a rational rate change and forwards a transformed chaotic sequence to the digital complex multiplier 352. The CEADG 350 generates a modulated acquisition sequence and forwards the same to the digital complex multiplier 352. The digital complex multiplier 352 performs a complex multiplication in the digital domain. In the digital complex multiplier 352, a modulated acquisition sequence from the CEADG 350 is multiplied by a digital representation of a chaotic sequence to yield a reference for a digital input signal that was generated at the transmitter 102 to facilitate initial acquisition. The chaotic sequence is generated in the chaos generator 340. The digital complex multiplier 352 communicates a reference signal to the multiplexers 346, 348. The multiplexers 346, 348 route the reference signal to the correlator 328. The correlator

328 is transitioned into a search mode. In this search mode, the correlator 328 searches across an uncertainty window to locate a received signal state so that the chaos generator 340 can be set with the time synchronized state vector.

Steady State Demodulation Mode:

In steady state demodulation mode, the correlator 328 tracks the correlation between the received modulated signal and the locally generated chaos close to the nominal correlation peak to generate magnitude and phase information as a function of time. This information is passed to the loop control circuit 320. The loop control circuit 320 applies appropriate algorithmic processing to this information to extract phase offset, frequency offset, and magnitude compensation information. The correlator 328 also passes its output information, based on correlation times terminated by symbol boundaries, to the hard decision block 330. The hard decision block 330 compares the correlation information to pre-determined thresholds to make hard symbol decisions. The loop control circuit 320 monitors the output of the correlator 318. When the loop control circuit 320 detects fixed correlation phase offsets, the phase control of the quadrature digital local oscillator 322 is modified to remove the phase offset. When the loop control circuit 320 detects phase offsets that change as a function of time, it adjusts the re-sampling filter 344 which acts as an incommensurate re-sampler when the receiver 104 is in steady state demodulation mode or the frequency control of the quadrature digital local oscillator 322 is modified to remove frequency or timing offsets. When the correlator's 328 output indicates that the received digital input signal timing has "drifted" more than plus or minus a half (½) of a sample time relative to a locally generated chaotic sequence. The loop control circuit 320: (1) adjusts a correlation window in an appropriate temporal direction by one sample time; (2) advances or retards a state of the local chaos generator 340 by one iteration state; and (3) adjusts the re-sampling filter 344 to compensate for the time discontinuity. This loop control circuit 320 process keeps the chaos generator 218 of the transmitter 102 and the chaos generator 340 of the receiver 104 synchronized to within half (½) of a sample time.

If a more precise temporal synchronization is required to enhance performance, a resampling filter can be implemented as a member of the class of polyphase fractional time delay filters. This class of filters is well known to persons skilled in the art, and therefore will not be described in great detail herein.

As described above, a number of chaotic samples are combined with an information symbol at the transmitter 102. Since the transmitter 102 and receiver 104 timing are referenced to two (2) different precision real time reference clock 212, 336 oscillators, symbol timing must be recovered at the receiver 104 to facilitate robust demodulation. Symbol timing recovery can include: (1) multiplying a received input signal by a complex conjugate of a locally generated chaotic sequence using the complex multiplier 324; (2) computing an N point running average of the product where N is a number of chaotic samples per symbol time; (3) storing the values, the maximum absolute values of the running averages, and the time of occurrence; and (4) statistically combining the values at the symbol timing recovery circuit 326 to recover symbol timing. It should be noted that symbol timing recover can also be accomplished via an output of the correlator 328. However, additional correlator operations are needed in such a scenario. As should be appreciated, using a separate multiplier operation for this purpose adds additional capabilities to the receiver 104, such as the capability to correlate and post process over multiple correlation windows simultaneously to locate the best statistical fit for symbol timing.

In this steady state demodulation mode, the symbol timing recovery circuit 326 communicates a symbol onset timing to the correlator 328 for controlling an initiation of a symbol correlation. The correlator 328 correlates a locally generated chaotic sequence with a received digital input signal during a symbol duration. In this regard, it should be understood that, the sense and magnitude of a real and imaginary components of the correlation is directly related to the values of the real and imaginary components of symbols of a digital input signal. Accordingly, the correlator 328 generates symbol soft decisions. The correlator 328 communicates the symbol soft decisions to the hard decision device 330 for final symbol decision making. The hard decision device 330 determines symbols using the symbol soft decisions. Thereafter, the hard decision device 330 communicates the symbols to the S/B converter 332. The S/B converter 332 converts the symbol decisions to a binary form. The S/B converter 332 is configured to communicate a binary data sequence to the source decoder 334. The source decoder 334 is configured to decide FEC applied at the transmitter 102 and pass the decoded bit stream to one or more external devices (not shown) utilizing the decoded data.

A person skilled in the art will appreciate that the receiver 104 is one architecture of a communications system receiver. However, the invention is not limited in this regard and any other receiver architecture can be used without limitation. For example, another embodiment of a receiver is provided in FIG. 3B.

Referring now to FIG. 3B, there is provided a block diagram of another embodiment of a receiver that is useful for understanding the invention. As shown in FIG. 3B, the receiver 390 is comprised of an antenna element 392, a low noise amplifier (LNA) 354, a zonal filter 356, intermediate frequency (IF) translators 358, 364, an anti-alias filter 360, and an analog-to-digital (A/D) converter 362. The receiver 390 is also comprised of a loop control circuit 366, a correlator 368, and a digital complex multiplier 370. The receiver 390 is further comprised of a receiver controller 374, a precision real time reference 376, a hard decision device 372, a symbol to bits (S/B) converter 384, and a source decoder 386. The receiver 390 is comprised of a residue number system (RNS) chaos generator 382 and a real uniform statistics to quadrature Gaussian statistics mapper 378. Each of the above listed components 354-386, 392 are similar to the respective components 302-306, 312, 314, 320, 328-342, 352 of FIG. 3A. Thus, the description provided above in relation to FIG. 3A is sufficient for understanding the receiver 390 architecture shown in FIG. 3B.

Chaos Generators and Digital Chaotic Sequence Generation

Figure 4:
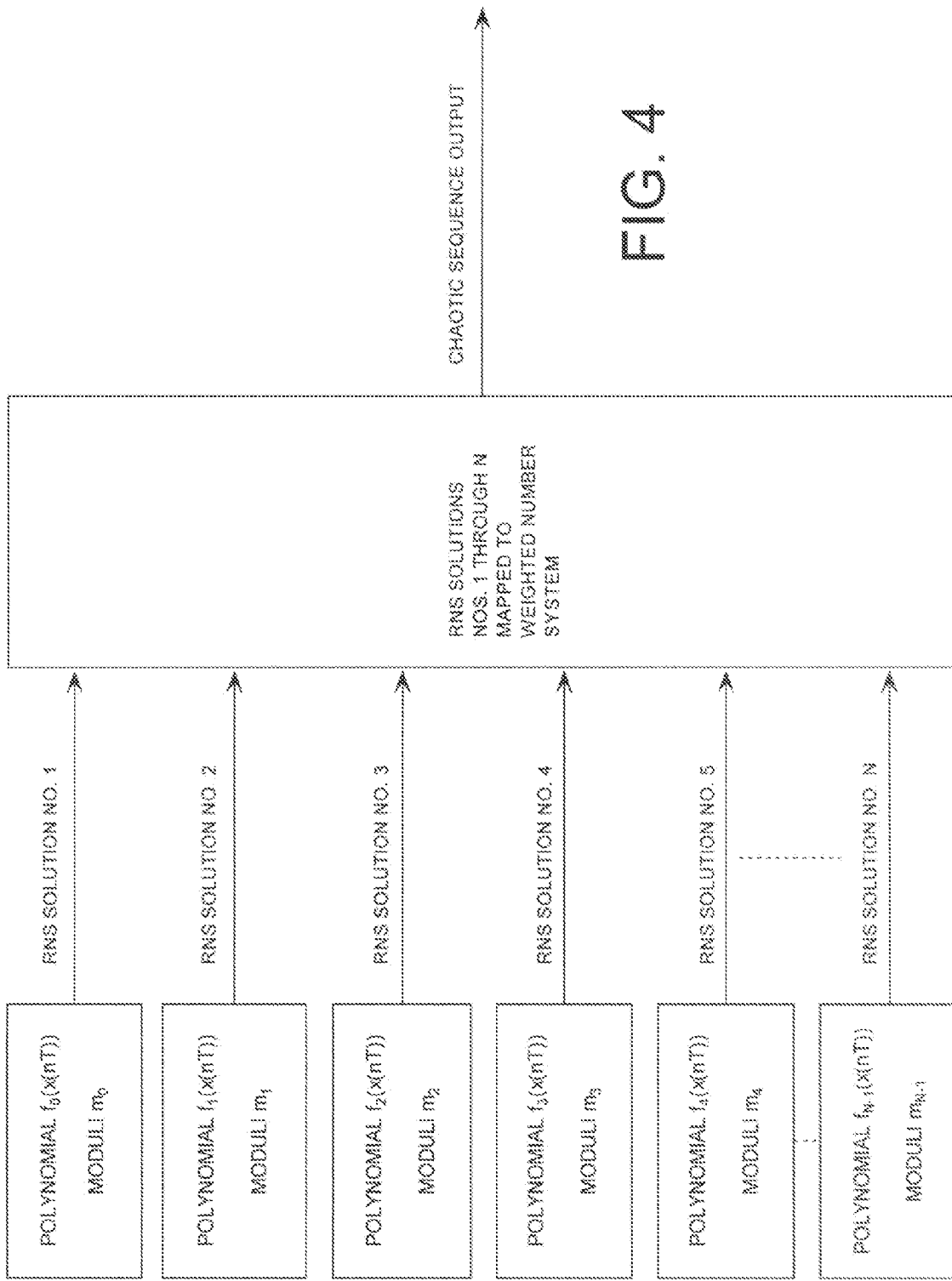
FIG. 4 is a conceptual diagram of the chaos generators of FIGS. 2-3 that is useful for understanding the invention.

Referring now to FIG. 4, there is provided a conceptual diagram of a chaos generator 218, 340, 382 (described above in relation to FIGS. 2-3B) that is useful for understanding the invention. As shown in FIG. 4, generation of the chaotic sequence begins with N polynomial equations $f_0(x(nT)), \ldots, f_{N-1}(x(nT))$. The N polynomial equations $f_0(x(nT)), \ldots, f_{N-1}(x(nT))$ can be selected as the same polynomial equation or as different polynomial equations. According to an aspect of the invention, the N polynomial equations $f_0(x(nT)), \ldots, f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation" as used herein refers to a polynomial equation that cannot be expressed as a product of at least two nontrivial polynomial equations over the same Galois field (f). For example, the polynomial equation f(x(nT)) is irreducible if there does not exist two (2) non-constant polynomial equations g(x(nT)) and h(x(nT)) in x(nT) with rational coefficients such that f(x(nT))=g(x(nT))·h(x(nT)).

As will be understood by a person skilled in the art each of the N polynomial equations $f_0(x(nT)), \ldots, f_{N-1}(x(nT))$ can be solved independently to obtain a respective solution. Each solution can be expressed as a residue number system (RNS) residue value using RNS arithmetic operations, i.e. modulo operations. Modulo operations are well known to persons skilled in the art. Thus, such operations will not be described in great detail herein. However, it should be appreciated that a RNS residue representation for some weighted value "a" can be defined by mathematical Equation (1).

$$R = \{a \text{ modulo } m_0, a \text{ modulo } m_1, \ldots, a \text{ modulo } m_{N-1}\} \quad (1)$$

where R is a RMS residue N-tuple value representing a weighted value "a". Further, R(nT) can be a representation of the RNS solution of a polynomial equation f(x(nT)) defined as $R(nT)=\{f_0(x(nT)) \text{ modulo } m_0, f_1(x(nT)) \text{ modulo } m_1, \ldots, f_{N-1}(x(nT)) \text{ modulo } m_{N-1}\}$. $m_0, m_1, \ldots, m_{N-1}$ respectively are the moduli for RNS arithmetic operations applicable to each polynomial equation $f_0(x(nT)), \ldots, f_{N-1}(x(nT))$.

From the foregoing, it will be appreciated that the RNS employed for solving each of the polynomial equations $f_0(x(nT)), \ldots, f_{N-1}(x(nT))$ respectively has a selected modulus value $m_0, m_1, \ldots, m_{N-1}$. The modulus value chosen for each RNS moduli is preferably selected to be relatively prime numbers $p_0, p_1, \ldots, p_{N-1}$. The phrase "relatively prime numbers" as used herein refers to a collection of natural numbers having no common divisors except one (1). Consequently, each RNS arithmetic operation employed for expressing a solution as a RNS residue value uses a different prime number $p_0, p_1, \ldots, p_{N-1}$ as a moduli $m_0, m_1, \ldots, m_{N-1}$.

Those skilled in the art will appreciate that the RNS residue value calculated as a solution to each one of the polynomial equations $f_0(x(nT)), \ldots, f_{N-1}(x(nT))$ will vary depending on the choice of prime numbers $p_0, p_1, \ldots, p_{N-1}$ selected as a moduli $m_0, m_1, \ldots, m_{N-1}$. Moreover, the range of values will depend on the choice of relatively prime numbers $p_0, p_1, \ldots, p_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_1(x(nT))$ has an integer value between zero (0) and four hundred ninety (490).

According to an embodiment of the invention, each of the N polynomial equations $f_0(x(nT)), \ldots, f_{N-1}(x(nT))$ is selected as an irreducible cubic polynomial equation having chaotic properties in Galois field arithmetic. Each of the N polynomial equations $f_0(x(nT)), \ldots, f_{N-1}(x(nT))$ can also be selected to be a constant or varying function of time. The irreducible cubic polynomial equation is defined by a mathematical Equation (2).

$$f(x(nT)) = Q(k)x^3(nT) + R(k)x^2(nT) + S(k)x(nT) + C(k,L) \quad (2)$$

where n is a sample time index value, k is a polynomial time index value. L is a constant component time index value. T is a fixed constant having a value representing a time interval or increment. Q, R, and S are coefficients that define the polynomial equation f(x(nT)). C is a coefficient of x(nT) raised to a zero power and is therefore a constant for each polynomial characteristic. In a preferred embodiment, a value of C is selected which empirically is determined to produce an irreducible form of the stated polynomial equation f(x(nT)) for a particular prime modulus. For a given polynomial with fixed values for Q, R, and S more than one value of C can exist, each providing a unique iterative sequence. Still, the invention is not limited in this regard.

According to another embodiment of the invention, the N polynomial equations $f_0(x(nT)), \ldots f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x^2(nT)+x(nT)+C_1$. A third polynomial equation $f_2(x(nT))$ is selected as $f_2(x(nT))=3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x^3(nT)+3x^2(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation f(x(nT)). Such constant values $C_0, C_1, \ldots, C_{N-1}$ and associated modulus $m_0, m_1, \ldots m_{N-1}$ values which produce an irreducible form of the stated polynomial equation f(x(nT)) are listed in the following Table (1).

TABLE 1

| Moduli values $m_0, m_1, \ldots, m_{N-1}$: | Sets of constant values $C_0, C_1, \ldots, C_{N-1}$: |
| --- | --- |
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Still, the invention is not limited in this regard.

The number of discrete magnitude states (dynamic range) that can be generated with the system shown in FIG. 4 will depend on the quantity of polynomial equations N and the modulus values $m_0, m_1, \ldots, m_{N-1}$ values selected for the RNS number systems. In particular, this value can be calculated as the product $M = m_0 \cdot m_1 \cdot m_3 \cdot m_4 \cdot \ldots \cdot m_{N-1}$.

Referring again to FIG. 4, it should be appreciated that each of the RNS solutions Nos. 1 through N is expressed in a binary number system representation. As such, each of the RNS solutions Nos. 1 through N is a binary sequence of bits. Each bit of the sequence has a zero (0) value or a one (1) value. Each binary sequence has a bit length selected in accordance with a particular moduli.

According to an embodiment of the invention, each binary sequence representing a residue value has a bit length (BL) defined by a mathematical Equation (3).

$$BL = \text{Ceiling}[\text{Log } 2(m)] \qquad (3)$$

where m is selected as one of moduli $m_0, m_1, \ldots, m_{N-1}$. Ceiling[u] refers to a next highest whole integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_0$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_1(x(nT))$ are in the range of zero (0) and four hundred ninety (490) which can be represented in nine (9) binary digits. Possible solutions for $f_2(x(nT))$ are in the range of zero (0) and four hundred seventy eight (478) which can be represented in nine (9) binary digits. Possible solutions for $f_3(x(nT))$ are in the range of zero (0) and four hundred sixty six (466) which can be represented in nine (9) binary digits. Possible solutions for $f_4(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x(nT)), \ldots, f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3,563,762,191,059,523$. The binary number system representation of each RNS solution can be computed using Ceiling[Log 2(3,563,762,191,059,523)]=Ceiling[51.66]=52 bits. Because each polynomial is irreducible, all 3,563,762,191,059,523 possible values are computed resulting in a sequence repetition time of every M times T seconds, i.e, a sequence repetition times an interval of time between exact replication of a sequence of generated values. Still, the invention is not limited in this regard.

Referring again to FIG. 4, the RNS solutions Nos. 1 through N are mapped to a weighted number system representation thereby forming a chaotic sequence output. The phrase "weighted number system" as used herein refers to a number system other than a residue number system. Such weighted number systems include, but are not limited to, an integer number system, a binary number system, an octal number system, and a hexadecimal number system.

According to an aspect of the invention, the RNS solutions Nos. 1 through N are mapped to a weighted number system representation by determining a series of digits in the weighted number system based on the RNS solutions Nos. 1 through N. The term "digit" as used herein refers to a symbol of a combination of symbols to represent a number. For example, a digit can be a particular bit of a binary sequence. According to another aspect of the invention, the RNS solutions Nos. 1 through N are mapped to a weighted number system representation by identifying a number in the weighted number system that is defined by the RNS solutions Nos. 1 through N. According to yet another aspect of the invention, the RNS solutions Nos. 1 through N are mapped to a weighted number system representation by identifying a truncated portion of a number in the weighted number system that is defined by the RNS solutions Nos. 1 through N. The truncated portion can include any serially arranged set of digits of the number in the weighted number system. The truncated portion can also be exclusive of a most significant digit of the number in the weighted number system. The phrase "truncated portion" as used herein refers to a chaotic sequence with one or more digits removed from its beginning and/or ending. The phrase "truncated portion" also refers to a segment including a defined number of digits extracted from a chaotic sequence. The phrase "truncated portion" also refers to a result of a partial mapping of the RNS solutions Nos. 1 through N to a weighted number system representation.

According to an embodiment of the invention, a mixed-radix conversion method is used for mapping RNS solutions Nos. 1 through N to a weighted number system representation. "The mixed-radix conversion procedure to be described here can be implemented in" [modulo moduli only and not modulo the product of moduli.] See *Residue Arithmetic and its Applications To Computer Technology*, written by Nicholas S. Szabo & Richard I. Tanaka, McGraw-Hill Book Co., New York, 1967. To be consistent with said reference, the following discussion of mixed radix conversion utilizes one (1) based variable indexing instead of zero (0) based indexing used elsewhere herein. In a mixed-radix number system, "a number x may be expressed in a mixed-radix form:

$$x = a_N \prod_{i=1}^{N-1} R_i + \ldots + a_3 R_1 R_2 + a_2 R_1 + a_1$$

where the $R_i$ are the radices, the $a_i$ are the mixed-radix digits, and $0 \leq a_i < R_i$. For a given set of radices, the mixed-radix representation of x is denoted by $(a_n, a_{n-1}, \ldots, a_1)$ where the digits are listed in order of decreasing significance." See Id. "The multipliers of the digits $a_i$ are the mixed-radix weights where the weight of $a_i$ is $$\prod_{j=1}^{i-1} R_j \text{ for } i \neq 1.\text{" See Id.}$$

For conversion from the RNS to a mixed-radix system, a set of moduli are chosen so that $m_i = R_i$. A set of moduli are also chosen so that a mixed-radix system and a RNS are said to be associated. "In this case, the associated systems have the same range of values, that is $$\prod_{i=1}^{N} m_i.$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_i + \ldots + a_3 m_1 m_2 + a_2 m_1 + a_1$$

where $a_i$ are the mixed-radix coefficients. The $a_i$ are determined sequentially in the following manner, starting with $a_1$." See Id.

$$x = a_N \prod_{i=1}^{N-1} m_i + \ldots + a_3 m_1 m_2 + a_2 m_1 + a_1$$

is first taken modulo $m_1$. "Since all terms except the last are multiples of $m_1$, we have $\langle x \rangle_{m_1} = a_1$. Hence, $a_1$ is just the first residue digit." See Id.

"To obtain $a_2$, one first forms $x-a_1$ in its residue code. The quantity $x-a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_1}.$$

Inspection of $$\left[ x = a_N \prod_{i=1}^{N-1} m_i + \ldots + a_3 m_1 m_2 + a_2 m_1 + a_1 \right]$$

shows then that x is $a_2$. In this way, by successive subtracting and dividing in residue notation, all of the mixed-radix digits may be obtained." See Id.

"It is interesting to note that $$a_1 = \langle x \rangle_{m_1}, a_2 = \left\langle \left\lfloor \frac{x}{m_1} \right\rfloor \right\rangle_{m_2}, a_3 = \left\langle \left\lfloor \frac{x}{m_1 m_2} \right\rfloor \right\rangle_{m_3}$$

and in general for $i > 1$ $$a_i = \left\langle \left\lfloor \frac{x}{m_1 m_2 \ldots m_{i-1}} \right\rfloor \right\rangle_{m_i}.\text{"}$$ See Id.

From the preceding description it is seen that the mixed-radix conversion process is iterative. The conversion can be modified to yield a truncated result. Still, the invention is not limited in this regard.

According to another embodiment of the invention, a Chinese remainder theorem (CRT) arithmetic operation is used to map the RNS solutions Nos. 1 through N to a weighted number system representation. The CRT arithmetic operation is well known in the art and therefore will not be described here in detail. The first known formulation of the Chinese Remainder Theorem is attributed to Sunzi in his "Book of Arithmetics" circa 500 A.D. However, a brief discussion of how the CRT is applied may be helpful for understanding the invention. The CRT arithmetic operation can be defined by a mathematical Equation (4) [returning to zero (0) based indexing].

$$Y = \left\{ \begin{array}{l} \left\langle [3x_0^3((n-1)T) + 3x_0^2((n-1)T) + x_0((n-1)T) + C_0(nT)]b_0 \right\rangle_{p_0} \frac{M}{p_0} \bigg|_M + \ldots + \\ \left\langle [3x_{N-1}^3((n-1)T) + 3x_{N-1}^2((n-1)T) + x_{N-1}((n-1)T) + C_{N-1}(nT)]b_{N-1} \right\rangle_{p_{N-1}} \frac{M}{p_{N-1}} \bigg|_M \end{array} \right\}_M \quad (4)$$

Mathematical Equation (4) can be re-written as mathematical Equation (5).

$$Y = \left\{ \begin{array}{l} \left\langle [3x_0^3((n-1)T) + 3x_0^2((n-1)T) + x_0((n-1)T) + C_0(nT)]b_0 \right\rangle_{p_0} \frac{M}{p_0} \bigg|_M + \ldots + \\ \left\langle [3x_{N-1}^3((n-1)T) + 3x_{N-1}^2((n-1)T) + x_{N-1}((n-1)T) + C_{N-1}(nT)]b_{N-1} \right\rangle_{p_{N-1}} \frac{M}{p_{N-1}} \bigg|_M \end{array} \right\}_M \quad (5)$$

where Y is the result of the CRT arithmetic operation. n is a sample time index value. T is a fixed constant having a value representing a time interval or increment. $x_0$-$x_{N-1}$ are RNS solutions Nos. 1 through N, $p_0$, $p_1$, . . . , $p_{n-1}$ am prime numbers. M is a fixed constant defined by a product of the relatively prime numbers $p_0$, $p_1$, . . . $p_{N-1}$. $b_0$, $b_1$, . . . , $b_{N-1}$ are fixed constants that are chosen as the multiplicative inverses of the product of all other primes modulo $p_0$, $p_1$, . . . , $p_{N-1}$, respectively. Equivalently, $$b_j = \left( \frac{M}{p_j} \right)^{-1} \mod p_j.$$

The $b_j$'s enable an isomorphic mapping between an RNS N-tuple value representing a weighted number and the weighted number. However without loss of chaotic properties, the mapping need only be unique and isomorphic. As such, a weighted number x can map into a tuple y. The tuple y can map into a weighted number z. The weighted number x is not equal to z as long as all tuples map into unique values for z in a range from zero (0) to M−1. Thus for certain embodiments of the present invention, the $b_j$'s can be defined as $$b_j = \left(\frac{M}{p_j}\right)^{-1} \mod p_j.$$

In other embodiments of the present invention, all $b_j$'s can be set equal to one or more non-zero values without loss of the chaotic properties.

As should be appreciated, the chaotic sequence output Y can be expressed in a binary number system representation. As such, the chaotic sequence output Y can be represented as a binary sequence. Each bit of the binary sequence has a zero (0) value or a one (1) value. The chaotic sequence output Y can have a maximum bit length (MBL) defined by a mathematical Equation (6).

$$MBL=\text{Ceiling}[\text{Log } 2(M)] \quad (6)$$

where M is the product of the relatively prime numbers $p_0$, $p_1, \ldots, P_{N-1}$ selected as moduli $m_0, m_1, \ldots, m_{N-1}$. In this regard, it should be appreciated the M represents a dynamic range of a CRT arithmetic operation. The phrase "dynamic range" as used herein refers to a maximum possible range of outcome values of a CRT arithmetic operation. It should also be appreciated that the CRT arithmetic operation generates a chaotic numerical sequence with a periodicity equal to the inverse of the dynamic range M. The dynamic range requires a Ceiling[Log 2(M)] bit precision.

According to an embodiment of the invention, M equals three quadrillion five hundred sixty-three trillion seven hundred sixty-two billion one hundred ninety-one million fifty-nine thousand five hundred twenty-three (3,563,762,191,059, 523). By substituting the value of M into Equation (6), the bit length (BL) for a chaotic sequence output Y expressed in a binary system representation can be calculated as follows: BL=Ceiling[Log 2(3,563,762,191,059,523)=52 bits. As such, the chaotic sequence output Y is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059, 522), inclusive. Still, the invention is not limited in this regard. For example, chaotic sequence output Y can be a binary sequence representing a truncated portion of a value between zero (0) and M−1. In such a scenario, the chaotic sequence output Y can have a bit length less than Ceiling[Log 2(M)]. It should be noted that while truncation affects the dynamic range of the system it has no effect on the periodicity of a generated sequence.

As should be appreciated, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical Equation (2) can be rewritten in a general iterative form: $f(x(nT)=Q(k)x^3((n-1)T)+R(k)x^2((n-1)T)+S(k)x((n-1)T)+C(k,L)$. For example, a fixed coefficient polynomial equation is selected as $f(x(n\cdot1 \text{ ms}))=3x^3((n-1)\cdot1 \text{ ms})+3x^2((n-1)\cdot1 \text{ ms})+x((n-1)\cdot1 \text{ ms})+8$ modulo 503. n is a variable having a value defined by an iteration being performed. x is a variable having a value allowable in a residue ring. In a first iteration, n equals one (1) and x is selected as two (2) which is allowable in a residue ring. By substituting the value of n and x into the stated polynomial equation f(x(nT)), a first solution having a value forty-six one (46) is obtained. In a second iteration, n is incremented by one and x equals the value of the first solution, i.e., forty-six (46) resulting in the solution 298, 410 mod 503 or one hundred thirty-one (131). In a third iteration, n is again incremented by one and x equals the value of the second solution.

Figure 5:
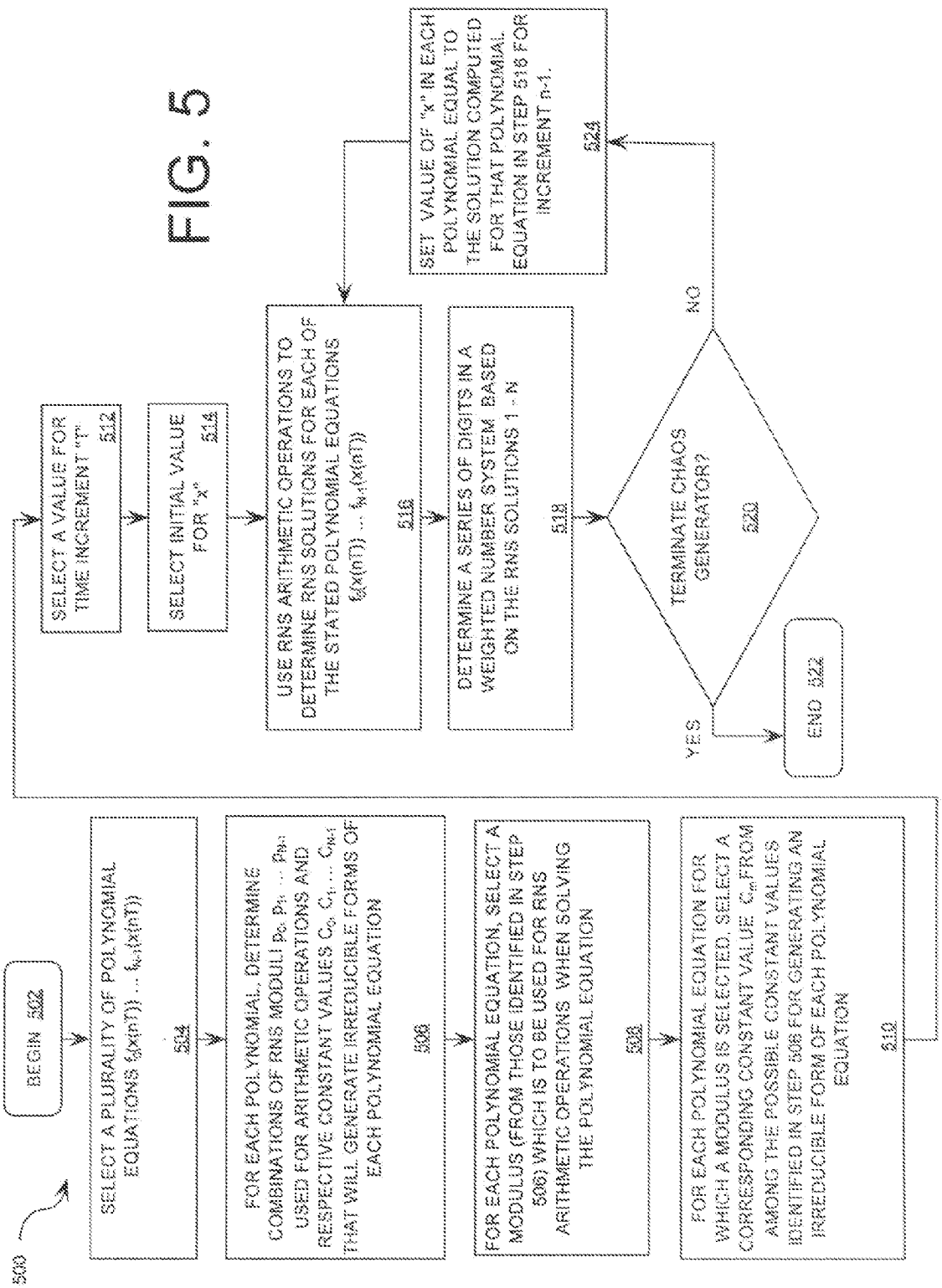
FIG. 5 is a flow diagram of a method for generating a chaotic sequence that is useful for understanding the invention.

Referring now to FIG. 5, there is provided a flow diagram of a method 500 for generating a chaotic sequence that is useful for understanding the invention. As shown in FIG. 5, the method 500 begins with step 502 and continues with step 504. In step 504, a plurality of polynomial equations $f_0(x(nT)), \ldots, f_{N-1}(x(nT))$ are selected. In this regard, it should be appreciated that the polynomial equations $f_0(x(nT)), \ldots, f_{N-1}(nT))$ can be selected as the same polynomial equation except for a different constant term or different polynomial equations. After step 504, step 506 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 508, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(nT))$. In this regard, it should be appreciated that the modulus is selected from the moduli identified in step 506. It should also be appreciated that a different modulus must be selected for each polynomial equation $f_0(x(nT)), \ldots, f_{N-1}(x(nT))$.

As shown in FIG. 5, the method 500 continues with a step 510. In step 510, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant $C_m$ is selected from among the possible constant values identified in step 508 for generating an irreducible form of the respective polynomial equation $f_0(x(nT)), \ldots, f_{N-1}(x(nT))$.

After step 510, the method 500 continues with step 512. In step 512, a value for time increment "T" is selected. Thereafter, an initial value for "x" is selected. In this regard, it should be appreciated that the initial value for "x" can be any value allowable in a residue ring. Subsequently, step 516 is performed where RNS arithmetic operations are used to iteratively determine RNS solutions for each of the stated polynomial equations $f_0(x(nT)), \ldots, f_{N-1}(x(nT))$. In step 518, a series of digits in a weighted number system are determined based in the RNS solutions. This step can involve performing a mixed radix arithmetic operation or a CRT arithmetic operation using the RNS solutions to obtain a chaotic sequence output.

After step 518, the method 500 continues with a decision step 520. If a chaos generator is not terminated (520:NO), then step 524 is performed where a value of "x" in each polynomial equation $f_0(x(nT)), \ldots, f_{N-1}(x(nT))$ is set equal to the RNS solution computed for the respective polynomial equation $f_0(x(nT)), \ldots, f_{N-1}(x(nT))$ in step 516. Subsequently, the method 500 returns to step 516. If the chaos generator is terminated (520:YES), then step 522 is performed where the method 500 ends.

A person skilled in the art will appreciate that the method 500 is one architecture of a method for generating a chaotic sequence. However, the invention is not limited in this regard and any other method for generating a chaotic sequence can be used without limitation.

Figure 6:
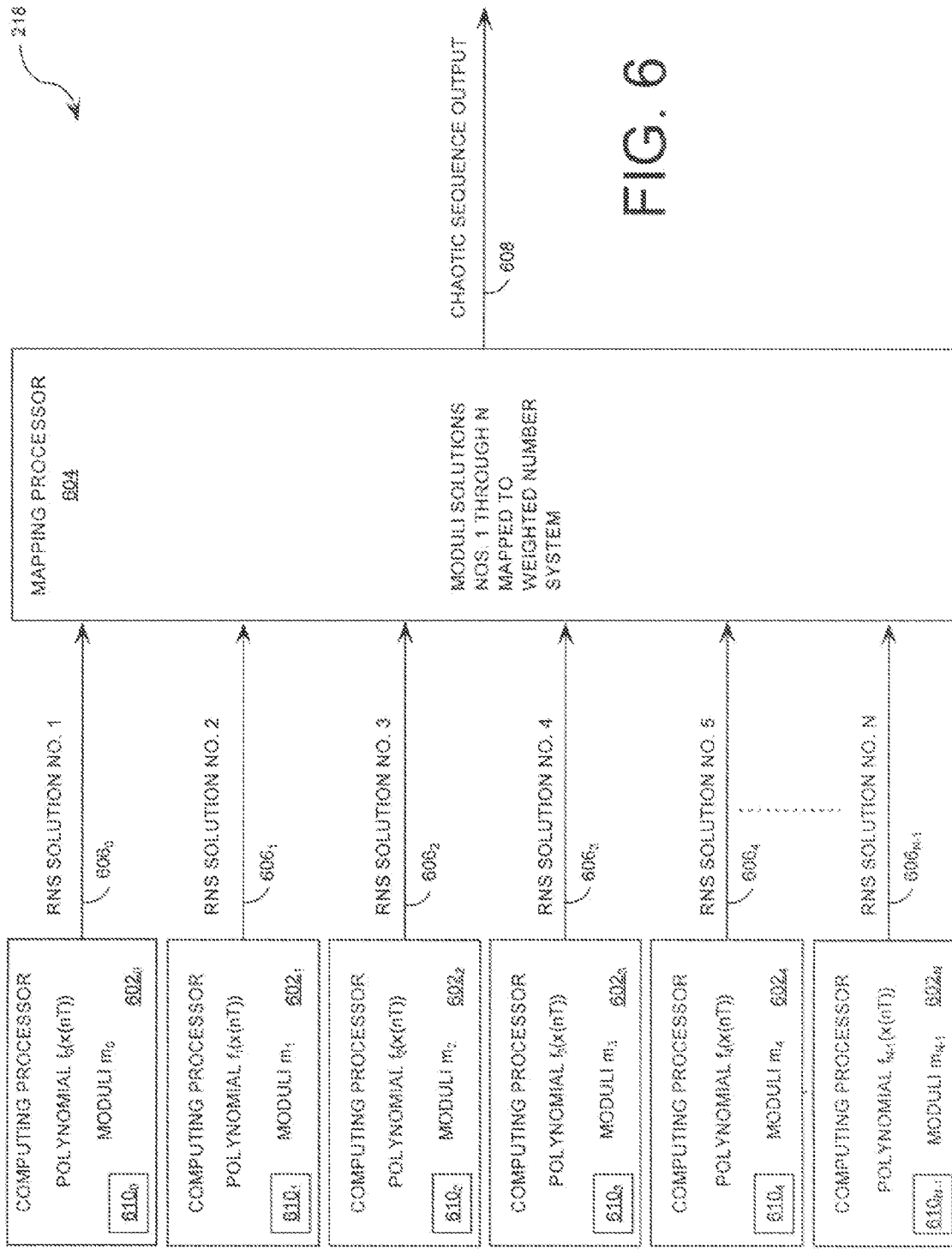
FIG. 6 is a block diagram of the chaos generator of FIG. 2 that is useful for understanding the invention.

Referring now to FIG. 6, there is illustrated one embodiment of a chaos generator 218. The chaos generator 218 is comprised of hardware and/or software configured to generate a digital chaotic sequence. In this regard, it should be appreciated that the chaos generator 218 is comprised of computing processors $602_0$-$602_{N-1}$. The chaos generator 218 is also comprised of a mapping processor 604. Each computing processor $602_0$-$602_{N-1}$ is coupled to the mapping processor 604 by a respective data bus $606_0$-$606_{N-1}$. As such, each computing processor $602_0$-$602_{N-1}$ is configured to communicate data to the mapping processor 604 via a respective data bus $606_0$-$606_{N-1}$. The mapping processor 604 can be coupled to an external device (not shown) via a data bus 608. In this regard, it should be appreciated that the external device (not shown) includes, but is not limited to, a communications device configured to combine or modify a signal in accordance with a chaotic sequence output.

Referring again to FIG. 6, the computing processors $602_0$-$602_{N-1}$ are comprised of hardware and/or software configured to solve N polynomial equations $f_0(x(nT)), \ldots, f_{N-1}(x(nT))$ to obtain a plurality of solutions. The N polynomial equations $f_0(x(nT)), \ldots, f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The N polynomial equations $f_0(x(nT)) \ldots f_{N-1}(x(nT))$ can also be identical exclusive of a constant value. The constant value can be selected so that a polynomial equation $f_0(x(nT)), \ldots, f_{N-1}(x(nT))$ is irreducible for a predefined modulus. The N polynomial equations $f_0(x(nT)), \ldots, f_{N-1}(x(nT))$ can further be selected as a constant or varying function of time.

Each of the solutions can be expressed as a unique residue number system (RNS) N-tuple representation. In this regard, it should be appreciated that the computing processors $602_0$-$602_{N-1}$ employ modulo operations to calculate a respective solution for each polynomial equation $f_0(x(nT)), \ldots, f_{N-1}(x(nT))$ using modulo based arithmetic operations. Each of the computing processors $602_0$-$602_{N-1}$ are comprised of hardware and/or software configured to utilize a different relatively prime number $p_0, p_1, \ldots, p_{N-1}$ as a moduli $m_0, m_1, \ldots, m_{N-1}$ for modulo based arithmetic operations. The computing processors $602_0$-$602_{N-1}$ are also comprised of hardware and/or software configured to utilize modulus $m_0, m_1, \ldots, m_{N-1}$ selected for each polynomial equation $f_0(x(nT)), \ldots, f_{N-1}(x(nT))$ so that each polynomial equation $f_0(x(nT)), \ldots, f_{N-1}(x(nT))$ is irreducible. The computing processors $602_0$-$602_{N-1}$ are further comprised of hardware and/or software configured to utilize moduli $m_0, m_1, \ldots, m_{N-1}$ selected for each polynomial equation $f_0(x(nT)), \ldots, f_{N-1}(x(nT))$ so that solutions iteratively computed via a feedback mechanism $610_0$-$610_{N-1}$ are chaotic. In this regard, it should be appreciated that the feedback mechanisms $610_0$-$610_{N-1}$ are provided so that the solutions for each polynomial equation $f_0(x(nT)), \ldots, f_{N-1}(x(nT))$ can be iteratively computed. Accordingly, the feedback mechanisms $610_0$-$610_{N-1}$ are comprised of hardware and/or software configured to selectively define a variable "x" of a polynomial equation as a solution computed in a previous iteration.

Referring again to FIG. 6, the computing processors $602_0$-$602_{N-1}$ are further comprised of hardware and/or software configured to express each of the RNS residue values in a binary number system representation. In this regard, the computing processors $602_0$-$602_{N-1}$ can employ an RNS-to-binary conversion method. Such methods are generally known to persons skilled in the art and therefore will not be described in great detail herein. However, it should be appreciated that any such method can be used without limitation. It should also be appreciated that the residue values expressed in binary number system representations are hereinafter referred to as moduli solutions Nos. 1 through N comprising the elements of an RNS N-tuple.

According to an embodiment of the invention, the computing processors $602_0$-$602_{N-1}$ are further comprised of memory based tables (not shown) containing pre-computed residue values in a binary number system representation. The address space of each memory table is at least from zero (0) to $m_m-1$ for all m, $m_0$ through $m_{N-1}$. On each iteration, the table address is used to initiate the sequence. Still, the invention is not limited in this regard.

Referring again to FIG. 6, the mapping processor 604 is comprised of hardware and/or software configured to map the moduli (RNS N-tuple) solutions Nos. 1 through N to a weighted number system representation. The result is a series of digits in the weighted number system based on the moduli solutions Nos. 1 through N. For example, the mapping processor 604 can be comprised of hardware and/or software configured to determine the series of digits in the weighted number system based on the RNS residue values using a Chinese Remainder Theorem process. In this regard, it will be appreciated by those skilled in the art that the mapping processor 604 is comprised of hardware and/or software configured to identify a number in the weighted number system that is defined by the moduli solutions Nos. 1 through N.

According to an aspect of the invention, the mapping processor 604 can be comprised of hardware and/or software configured to identify a truncated portion of a number in the weighted number system that is defined by the moduli solutions Nos. 1 through N. For example, the mapping processor 604 can also be comprised of hardware and/or software configured to select the truncated portion to include any serially arranged set of digits of the number in the weighted number system. Further, the mapping processor 604 can include hardware and/or software configured to select the truncated portion to be exclusive of a most significant digit when all possible weighted numbers represented by P bits are not mapped, i.e., when $M-1<2^P$. P is a fewest number of bits required to achieve a binary representation of the weighted numbers. Still, the invention is not limited in this regard.

Referring again to FIG. 6, the mapping processor 604 is comprised of hardware and/or software configured to express a chaotic sequence in a binary number system representation. In this regard, it should be appreciated that the mapping processor 604 can employ a weighted-to-binary conversion method. Such methods are generally known to persons skilled in the art and therefore will not be described in great detail herein. However, it should be appreciated that any such method can be used without limitation.

A person skilled in the art will appreciate that the chaos generator 218 is one architecture of a chaos generator. However, the invention is not limited in this regard and any other chaos generator architecture can be used without limitation.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for coherently modulating and demodulating a chaotic sequence spread spectrum signal within a communication system, comprising:
    channel encoding, by a transmitter of said communication system, a carrier with a plurality of information symbols;
    generating an identical string of discrete time chaotic samples at said transmitter and a receiver of said communication system by
        selecting a plurality of polynomial equations;
        using residue number system (RNS) arithmetic operations to respectively determine a plurality of solutions for said plurality of polynomial equations, said plurality of solutions iteratively computed and expressed as RNS residue values; and
        determining a series of digits in a weighted number system based on said plurality RNS residue values;
    modulating, at said transmitter, said carrier in a chaotic manner using said string of discrete time chaotic samples, each of said discrete time chaotic samples having a shorter sample time interval than a duration of said plurality of information symbols;
    utilizing, at said transmitter, an accurate time reference to minimize a timing difference uncertainty between each said string of discrete time chaotic samples generated at said transmitter and said receiver;
    synchronizing, at said receiver, each said string of discrete time chaotic samples in time and frequency; and
    maintaining synchronization of said string of discrete time chaotic samples in time and frequency at each said transmitter and said receiver for a duration of an information transfer.

2. The method according to claim 1, further comprising using, at said transmitter or receiver, a Chinese Remainder Theorem process to determine said series of digits in said weighted number system based on said plurality of RNS residue values.

3. The method according to claim 1, wherein said determining a series of digits step further comprises identifying a number in said weighted number system that is defined by said plurality of RNS residue values.

4. The method according to claim 1, wherein said determining a series of digits step further comprises identifying a truncated portion of a number in said weighted number system that is defined by said plurality of RNS residue values.

5. The method according to claim 4, wherein said truncated portion is selected to include any serially arranged set of digits comprising a portion of said number in said weighted number system.

6. The method according to claim 5, wherein said truncated portion is exclusive of a most significant digit comprising said number in said weighted number system.

7. The method according to claim 1, further comprising using at said transmitter and receiver a value selected for each of N moduli in an RNS for solving each of said plurality of polynomial equations.

8. The method according to claim 7, wherein each said modulus for each of said plurality of polynomial equations is selected so that each said polynomial equation is irreducible.

9. The method according to claim 7, wherein each said modulus for each of said plurality of polynomial equations is selected so that solutions iteratively computed via a feedback mechanism for said polynomial equations are chaotic.

10. The method according to claim 1, wherein said polynomial equations are selected to include at least a cubic type polynomial equation.

11. The method according to claim 1, wherein each of said plurality of polynomial equations is selected to be identical exclusive of a constant value.

12. The method according to claim 11, wherein said constant value is selected so that a polynomial equation is irreducible for a predefined modulus.

13. The method according to claim 1, wherein said polynomial equation is selected to be at least one of a constant or varying function of time.

14. The method according to claim 1, further comprising iteratively computing said plurality of solutions at said transmitter or receiver using a feedback mechanism.

15. The method according to claim 14, further comprising selectively defining, at said feedback mechanism, a value of a variable of a polynomial equation for each solution iteratively computed, said value based on a previous iteratively computed solution of said polynomial equation.

16. The method according to claim 1, wherein said weighted number system is a binary number system.

17. The method according to claim 1, further comprising synchronizing said strings of discrete time chaotic samples at said receiver exclusive of a constant or periodic transfer of state update information.

18. A system, comprising:
    a channel encoder configured for channel encoding a carrier responsive to a plurality of information symbols;
    a chaotic sequence generator configured for generating a continuous string of discrete time samples, each of said discrete time samples having a shorter sample time interval than a duration of said plurality of information symbols, said chaotic sequence generator comprising at least one first processor configured for
        using residue number system (RNS) arithmetic operations to respectively determine a plurality of solutions for a plurality of polynomial equations, said plurality of solutions iteratively computed and expressed as RNS residue values, and
        determining a series of digits in a weighted number system based on said plurality of RNS residue values;
    a multiplier operatively coupled to said chaotic sequence generator and said channel encoder, said multiplier configured for modulating said carrier in a chaotic manner using said string of discrete time samples;
    an accurate time reference configured for minimizing a timing difference uncertainty between said strings of discrete time chaotic samples generated at said transmitter and said receiver; and
    at least one second processor configured for initially synchronizing said strings of discrete time chaotic samples in time and frequency and for maintaining synchronization of each said string of discrete time chaotic samples in time and frequency at each of said transmitter and said receiver for a duration of an information transfer.

19. The system according to claim 18, wherein said first processor is further configured for determining a series of digits in said weighted number system based on said plurality of RNS residue values using a Chinese Remainder Theorem process.

20. The system according to claim 18, wherein said first processor is further configured for identifying a number in said weighted number system that is defined by said plurality RNS residue values.

21. The system according to claim 18, wherein said first processor is further configured for identifying a truncated portion of a number in said weighted number system that is defined by said plurality of RNS residue values.

22. The system according to claim 21, wherein said first processor is further configured for selecting said truncated portion to include any serially arranged set of digits comprising a portion of said number in said weighted number system.

23. The system according to claim 22, wherein said first processor is further configured for selecting said truncated portion exclusive of a most significant digit when all possible weighted numbers represented by greater than P−1 bits but less than P bits, said P is a fewest number of bits required to achieve a binary representation of said weighted numbers.

24. The system according to claim 18, wherein said first processor is further configured for utilizing a modulus selected for each of said plurality of polynomial equations so that each said polynomial equation is irreducible.

25. The system according to claim 18, wherein said first processor is further configured for utilizing modulus selected for each of said plurality of polynomial equations so that solutions iteratively computed via a feedback mechanism for said polynomial equations are chaotic.

26. The system according to claim 18, wherein said plurality of polynomial equations include at least a cubic type polynomial equation.

27. The system according to claim 18, wherein said plurality of polynomial equations are identical exclusive of a constant value.

28. The system according to claim 27, wherein said constant value is selected so that a polynomial equation is irreducible for a predefined modulus.

29. The system according to claim 18, wherein said plurality of polynomial equations are at least one of a constant or varying function of time.

30. The system according to claim 18, further comprising a feedback mechanism configured for selectively defining a variable "x" of a polynomial equation as a solution computed in a previous iteration.

* * * * *